US012415453B2

(12) United States Patent
Leppiaho

(10) Patent No.: US 12,415,453 B2
(45) Date of Patent: Sep. 16, 2025

(54) LOADING ARRANGEMENT FOR LOADING AND UNLOADING LOAD UNITS ON AND OFF A VEHICLE

(71) Applicant: CONTLE OY, Eura (FI)

(72) Inventor: Tommi Leppiaho, Turku (FI)

(73) Assignee: CONTLE OY, Eura (FI)

( * ) Notice: Subject to any disclaimer, the term of this patent is extended or adjusted under 35 U.S.C. 154(b) by 11 days.

(21) Appl. No.: 18/010,854

(22) PCT Filed: Jun. 18, 2021

(86) PCT No.: PCT/FI2021/050466
§ 371 (c)(1),
(2) Date: Dec. 16, 2022

(87) PCT Pub. No.: WO2021/255345
PCT Pub. Date: Dec. 23, 2021

(65) Prior Publication Data
US 2023/0331135 A1 Oct. 19, 2023

(30) Foreign Application Priority Data

Jun. 18, 2020 (FI) .................................... 20205644

(51) Int. Cl.
*B60P 1/44* (2006.01)
*B60P 1/54* (2006.01)

(52) U.S. Cl.
CPC ........... *B60P 1/4485* (2013.01); *B60P 1/5457* (2013.01)

(58) Field of Classification Search
CPC ..... B60P 1/4485; B60P 1/5457; B60P 1/6463; B60P 1/64; B60P 1/6427; B60P 7/13; B66C 1/663
See application file for complete search history.

(56) References Cited

U.S. PATENT DOCUMENTS 4,854,807 A * 8/1989 Bishop ................. B65D 88/129
D34/28
4,968,080 A * 11/1990 Kerry ..................... B66C 1/663
294/81.53
(Continued)

FOREIGN PATENT DOCUMENTS

DE 3922811 A1 1/1991
EP 0319627 A1 6/1989
(Continued)

OTHER PUBLICATIONS

International Search Report and Written Opinion in Application No. PCT/FI2021/050466, mailed Sep. 16, 2021, 15 pages.
(Continued)

*Primary Examiner* — Mark C Hageman
(74) *Attorney, Agent, or Firm* — Meunier Carlin & Curfman LLC

(57) ABSTRACT

A loading arrangement for loading and unloading load units on and/or off a vehicle comprises a frame, wherein said frame has first and second ends and to be fastened to the vehicle in a detachable manner. The arrangement comprises also a transferring device for catching and transferring the load unit on and/or off the vehicle, said transferring device comprising a gripping point to be gripped by a hook system of the vehicle and a catching device for catching said load unit and for transferring it on or off the vehicle, when the transferring device is operated by said hook system of the vehicle. The frame comprises a dock, which is arranged in the first end of the frame and wherein the dock comprises a receiving portion for receiving the transferring device for at least loading and unloading said frame on and/or off the vehicle by the transferring device when said transferring device is operated by a hook system of the vehicle.

19 Claims, 22 Drawing Sheets

(56) References Cited

U.S. PATENT DOCUMENTS

| | | | |
|---|---|---|---|
| 5,395,203 A | 3/1995 | Januel et al. | |
| 5,803,699 A * | 9/1998 | Pinkston | B65D 90/146 |
| | | | 414/812 |
| 7,270,511 B2 * | 9/2007 | Lockamy | B60P 1/6427 |
| | | | 414/498 |
| 2004/0083671 A1 | 5/2004 | Johnson et al. | |
| 2004/0191038 A1 * | 9/2004 | Lockamy | B60P 1/6427 |
| | | | 414/498 |
| 2010/0054899 A1 * | 3/2010 | Hacker | B60P 1/6463 |
| | | | 414/470 |
| 2021/0114829 A1 * | 4/2021 | Leppiaho | B60P 1/649 |

FOREIGN PATENT DOCUMENTS

| | | | |
|---|---|---|---|
| EP | 340937 A * | 11/1989 | B60P 1/6463 |
| EP | 0344948 A2 | 2/1993 | |
| EP | 0925999 A2 | 6/1999 | |
| FR | 2750088 A1 | 12/1997 | |
| KR | 100940889 B1 | 2/2010 | |
| RU | 2091255 C1 | 9/1997 | |
| RU | 35770 U1 | 2/2004 | |

OTHER PUBLICATIONS

Search Report in Finnish Application No. 20205644, dated Jan. 15, 2021, 1 page.
Search Report issued by the European Patent Office in the corresponding application No. 21826365.5 on Apr. 25, 2024.

* cited by examiner

LOADING ARRANGEMENT FOR LOADING AND UNLOADING LOAD UNITS ON AND OFF A VEHICLE

CROSS REFERENCES

This application is a U.S. national stage application of international patent application number PCT/FI2021/050466 filed on Jun. 18, 2021 claiming priority to Finnish national application number FI20205644 filed on Jun. 18, 2020.

TECHNICAL FIELD OF THE INVENTION

The invention relates to a loading arrangement for loading and unloading load units on and/or off a vehicle, such as a truck.

BACKGROUND OF THE INVENTION

It is known to transport a skip or interchangeable load unit by a vehicle, such as a truck, and load and unload the load unit on or off the vehicle using a skip arrangement. In order to enable the loading and unloading of the load unit by the skip arrangement, the vehicle need to be provided typically for example with a hook system, but in addition to the load unit must be compatible with the skip arrangement of the vehicle and the vehicle must be configured to receive the load unit with the compatible skip arrangement.

However, some problems may arise due to different types of load units, which are not compatible with the skip arrangements of the vehicle, whereupon this kind of load units, such as for example sea containers or shipping containers, cannot be pulled by the hook system of the vehicle on the vehicle. Also, some problems may arise due to different hook systems or skip arrangements of the vehicle, which are not compatible with the load units, for example it is not possible to catch and load the sea or shipping container with a conventional hook system or lift system of the vehicle and pull or drag it on the vehicle.

SUMMARY OF THE INVENTION

An object of the invention is to alleviate and eliminate the problems relating to the known prior art. Especially the object of the invention is to provide an arrangement and method for loading and unloading load units on and/or off a vehicle regardless of the type of load unit or vehicle. In addition, the object of the invention is to make possible to load and unload load units on and/or off the vehicle regardless of the type of load unit or vehicle and so that there is no need to make any modifications either to vehicles or load units.

The object of the invention can be achieved by the features of independent claims.

The invention relates to an arrangement for loading and unloading load units on and/or off a vehicle according to claim 1. In addition, the invention relates to a transferring device, a frame, and a method for loading and unloading load units on and/or off a vehicle.

According to an embodiment of the invention a loading arrangement for loading and unloading load units on and/or off a vehicle comprises a frame and a transferring device. The frame has first and second ends and is configured to be fastened to the vehicle in a detachable manner. The load unit may be for example a container or sea container, shipping container, tank, or the like and has first and second ends. The load unit comprises advantageously also at least a first fastening device so that the load unit can be caught. The first fastening device is for example hole or hook or the like e.g. by sides of the load unit in said first end but can naturally be also other kind of fastening device, such as a pin, pivot, plug, groove or cable. For example, the sea container typically comprises the fastening device in each corner of it, the fastening device having a hole in each side, and in particularly in the bottom portion and side portion (also in the front and rear portions), and both in said first end second ends of the load unit.

The frame comprises advantageously two elongated frame elements with first and second ends, having a longitudinal axis between said ends. In addition, the frame has advantageously an opening between the elongated frame elements so that for example the hook system of the vehicle can be operated between said frame elements in the direction of the longitudinal axis, so backward and forward directions. For example, when the frame is arranged or mounted on the vehicle, the hook system can be lifted up and transferred via or in the opening for loading or unloading the load unit on or off the vehicle so that there is no need to remove the frame from the vehicle.

In addition, according to advantageous embodiment the frame comprises a dock, which is arranged in the first end of the frame. Advantageously the dock is arranged in fixed way, whereupon it also strengthens the structure durability of the frame. In addition, when the dock is arranged in the first end, the opening is still remained between the elongated frame elements so that the hook system of the vehicle can be operated. The dock comprises advantageously a receiving portion for receiving the transferring device. When the transferring device is received by the receiving portion of the dock, the frame can be loaded and unloaded on and/or off the vehicle by operating the transferring device with the hook system of the vehicle. In addition, the receiving portion of the dock may also be used for receiving the first end, such as the bottom end, of the load unit when the load unit is loaded on the vehicle.

The dock, such as the receiving portion, comprises advantageously a locking device to be fastened to the first fastening device, such as the first fastening hole in the underside or bottom portion of the load unit in said first end (so the fastening hole pointing downwards in the sea container, for example). In this way the first end of said load unit can be fastened to the frame in a detachable manner, and again via the frame to the vehicle.

According to an advantageous embodiment the frame comprises also a ramp, which is hinged in the second end of the frame. The ramp is also configured to be hinged around a rear roller of the vehicle. This can be implemented e.g. by at least one separate locking hinge piece, which is arranged around (at least partly around) the rear roller and then fastened to the ramp, advantageously to the second end portion of the ramp. This offer advantage, namely in this way the ramp divides load or stress of the load unit to the vehicle structure via the rear roller of the vehicle, especially when said load unit is transferred (loaded or unloaded). In addition, the frame can be fastened in this way to the vehicle via said rear roller in a detachable manner.

According to an embodiment the transferring device is used for loading and unloading the frame, but also for catching and transferring the load unit on and/or off the vehicle. The transferring device comprises advantageously a catching device for catching the load unit via the fastening device of the load unit. The catching device may be for example a hook, pin, pivot, plug, clamp, bolt, twist, screw or cable or the like, depending on the type of the fastening device of the load unit. For example, the fastening device of the typical sea container is a hole (at least two holes pointing different sides in each corner, so first and second fastening devices), whereupon the catching device is advantageously a plug or other suitable catching device, which can be used for catching. According to an embodiment, the catching device of the transferring device is replaceable catching device.

In addition, the transferring device advantageously comprises a gripping point to be gripped by the hook system of the vehicle. Thus, when the catching device is fastened to the fastening device of the load unit, the load unit can be transferred, such as loaded or unloaded on or off the vehicle by the transferring device, when the transferring device is operated by the hook system of the vehicle. It is to be noted that in this way also the typical sea container can be loaded to the vehicle with the conventional type skip system or hook lift system.

The transferring device may also comprise an elongated boom having first and second ends, where the elongated boom is coupled with the transferring device via a joint arranged in the second end of the elongated boom. In this embodiment, the elongated boom comprises also the gripping point to be gripped by the hook system of the vehicle. The gripping point is advantageously arranged next to the joint to the second end of the elongated boom and towards the first end of the elongated boom from the gripping point. Thus, when the joint locates closer to the second end of the elongated boom than the gripping point, it functions as a levelling point and balances (due to gravity) a position and possible swinging of the transferring device when it is moved e.g. towards the load unit for catching it. In addition, the elongated boom functions as a lever arm and supports the first end (bottom portion of it) of the elongated boom to the boom of the hook system of the vehicle during loading/unloading the load unit by the transferring device. This allows more optimal position and angle to the hook system for lifting the load unit during loading/unloading.

According to an embodiment the frame is configured to receive and secure the transferring device in a detachable manner. In addition, the dock may comprise a securing device for securing the transferring device in a detachable manner. The securing device may comprise for example a hook to be fastened to a corresponding groove in the transferring device, but naturally the securing device and the corresponding securing point in the transferring device can be implemented also in other ways, such as by a rim screw or the like. Advantageously the transferring device is configured to be released for transferring the load unit on and/or off the vehicle and to be secured for transporting said transferring device, for example. In addition, it is to be noted that the transferring device is advantageously secured to the dock of the frame for loading and unloading the frame, where the transferring device is operated by the hook system and thereby also the frame to which said transferring device is coupled is transferred.

The embodiments of the invention offer advantages, namely when the catching device of the transferring device is unfastened from the second fastening device of the load unit and the locking device of the dock is still fastened to the first fastening device of the load unit, the transferring device can be removed from the dock and frame so that the load unit is still fastened to the dock and frame via the locking device of the dock. If the frame is also fastened to the vehicle, the load unit is also fastened to the same vehicle via 10 the frame, or the frame with the load can also be left to the ground and the transferring device can be taken to the vehicle for example for loading another frame (with or without) to the vehicle, for example.

In addition, it is to be noted that the frame can be unfastened from the rear roller of the vehicle, whereupon the frame with the load unit can be transferred to a ground by the transferring device (when the transferring device is still secured to the dock and frame). When the frame with the load unit is transferred to the ground, the transferring device can be then unfastened from said second fastening device and removed so that the frame with the load unit is still left to the ground. In addition, it is to be noted that the transferring device can be used for transferring the frame with the fastened load unit also from the trailer to the vehicle and vice versa, from the vehicle to the trailer.

The invention also offers further advantages, namely the embodiments of the invention described in this document can be used for loading and unloading the load units on and/or off the vehicle regardless of the type of the load unit or vehicle in an easy, safe and fast way. In addition, according to the embodiments of the invention there is even no need to make any modifications either to vehicles or load units for enabling the loading and unloading of the load units on and/or off the vehicle regardless of the type of the load unit or vehicle. In other words, there is no need to weld any rails or bars on the bottom portion of the sea container in order to make sea container compatible with the vehicles with the hook lift skip systems. In addition, if the sea container would be provided with the fixed rails or bars, it would not be seaworthy anymore. Still in addition, any vehicle with a suitable hook lift system (small or bigger) can be turned a vehicle for transporting e.g. sea or shipping containers so that there is again no need to make any modifications to the vehicle or load units, such as sea or shipping containers, as such. Furthermore, because there is no need to provide the vehicles or the load units with fixed modifications, lots of savings can be achieved, because there is no additional mass to be transported.

The exemplary embodiments presented in this text are not to be interpreted to pose limitations to the applicability of the appended claims. The verb "to comprise" is used in this text as an open limitation that does not exclude the existence of also unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific example embodiments when read in connection with the accompanying drawings.

BRIEF DESCRIPTION OF THE DRAWINGS

Next the invention will be described in greater detail with reference to exemplary embodiments in accordance with the accompanying drawings, in which.

DETAILED DESCRIPTION

Figure 1:
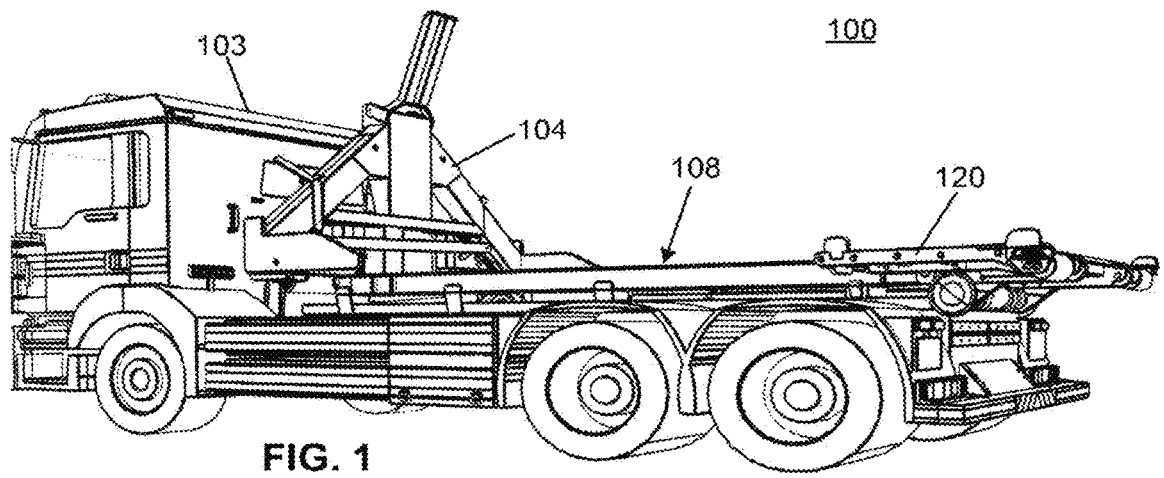
FIG. 1 illustrates an exemplary vehicle with a loading arrangement for loading and unloading load units on and/or off a vehicle according to an advantageous embodiment of the invention.

FIG. 1 illustrates a truck as an exemplary vehicle 103 with a loading arrangement 100 for loading and unloading load units 101 on and/or off a vehicle 103 according to an advantageous embodiment of the invention. The loading arrangement 100 comprises a frame 108, which is mounted on the vehicle 103 in FIG. 1 advantageously in a detachable manner.

Figure 2:
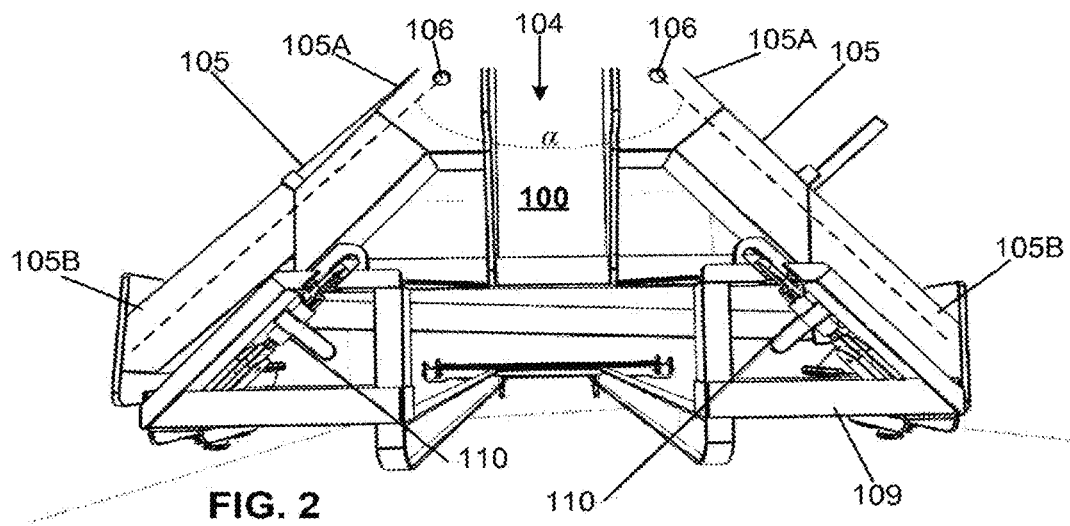
FIGS. 2-6 illustrate a principle of an exemplary transferring device of the loading arrangement according to an advantageous embodiment of the invention.
Figure 3:
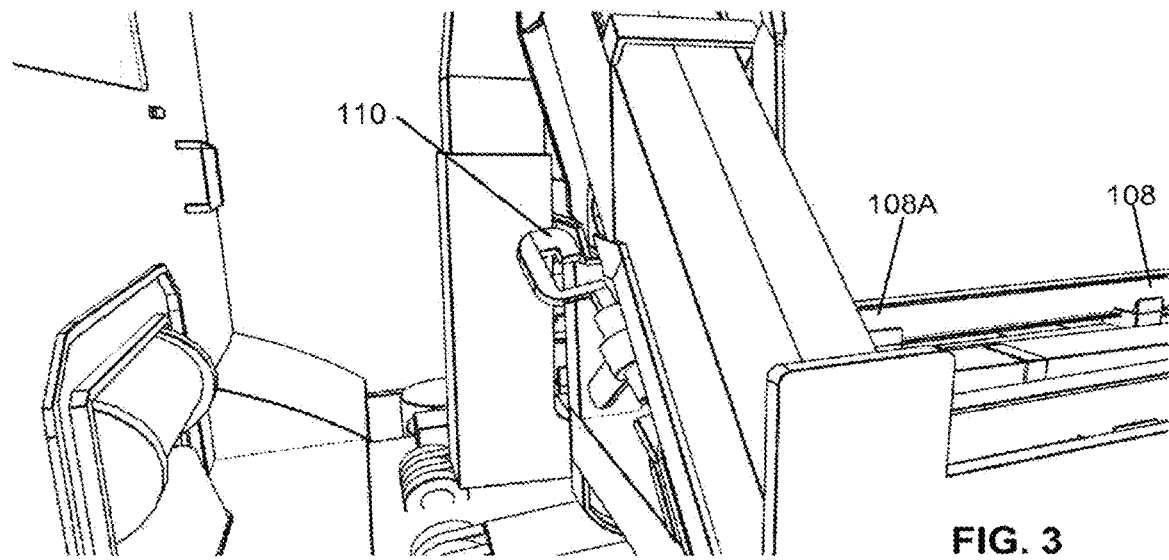
Figure 4:
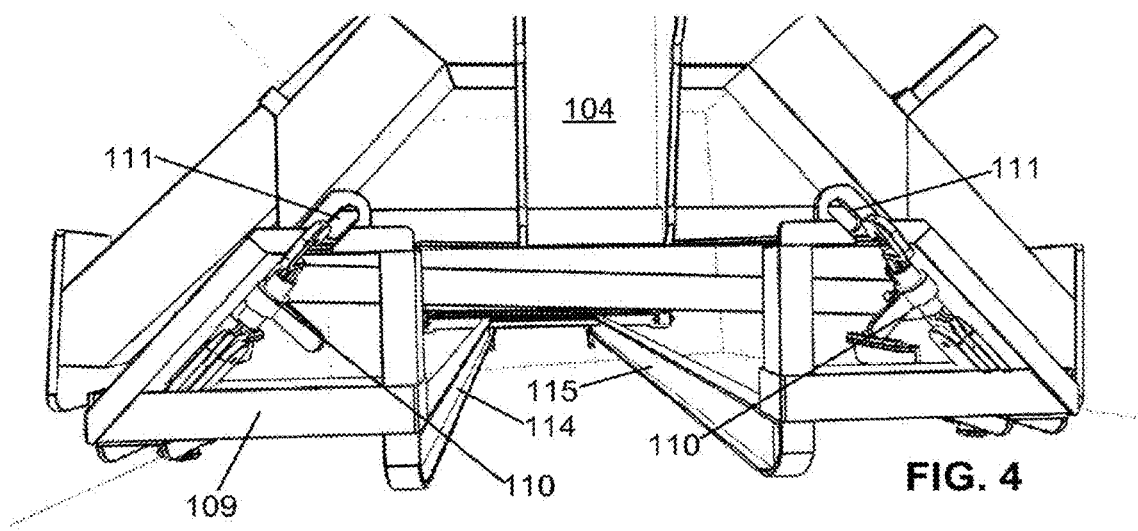
Figure 5:
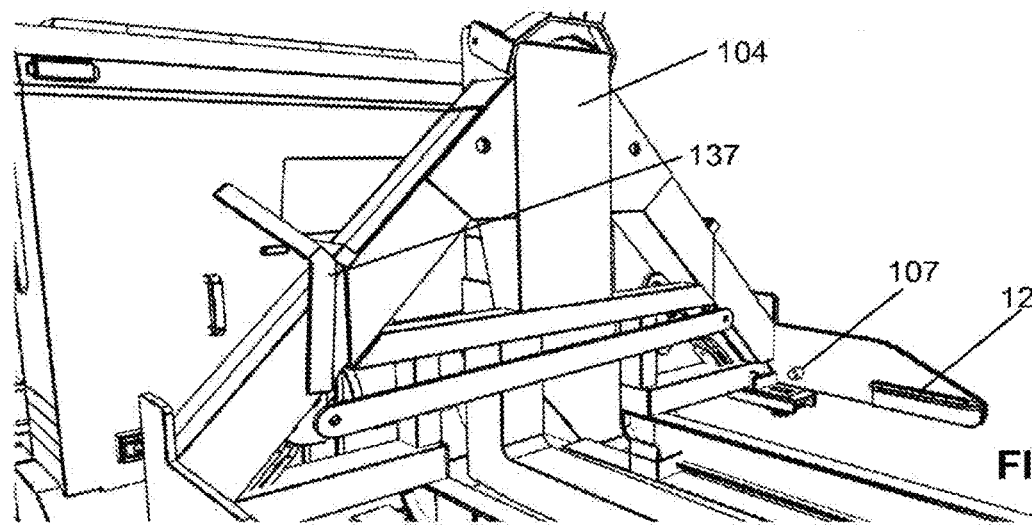
Figure 6:
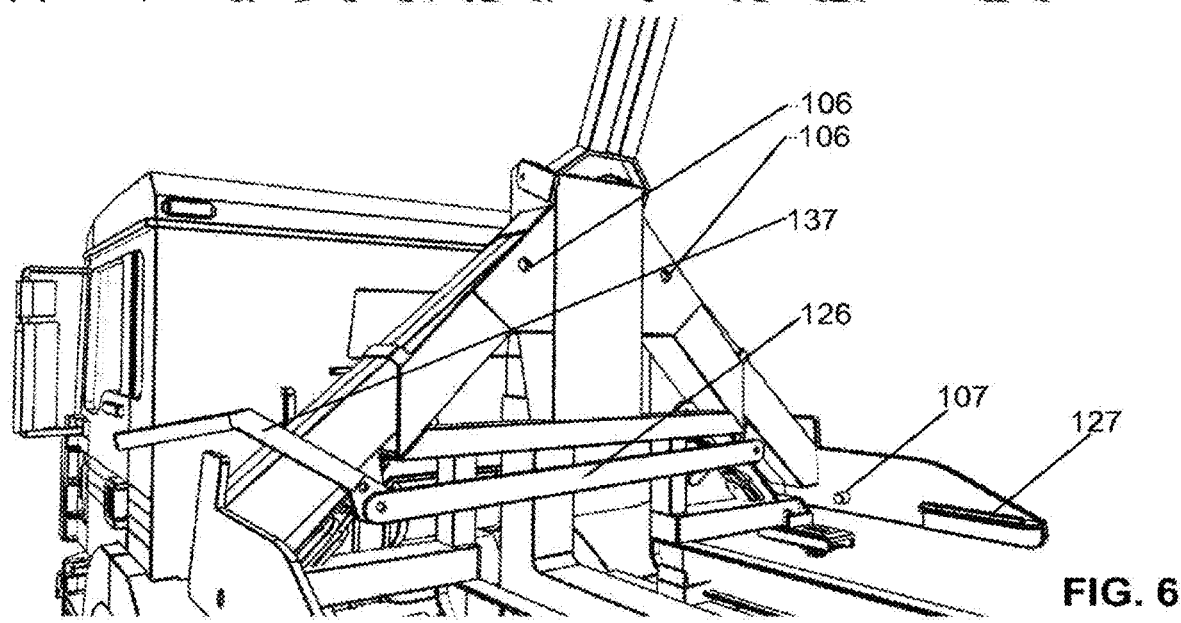
Figure 74:
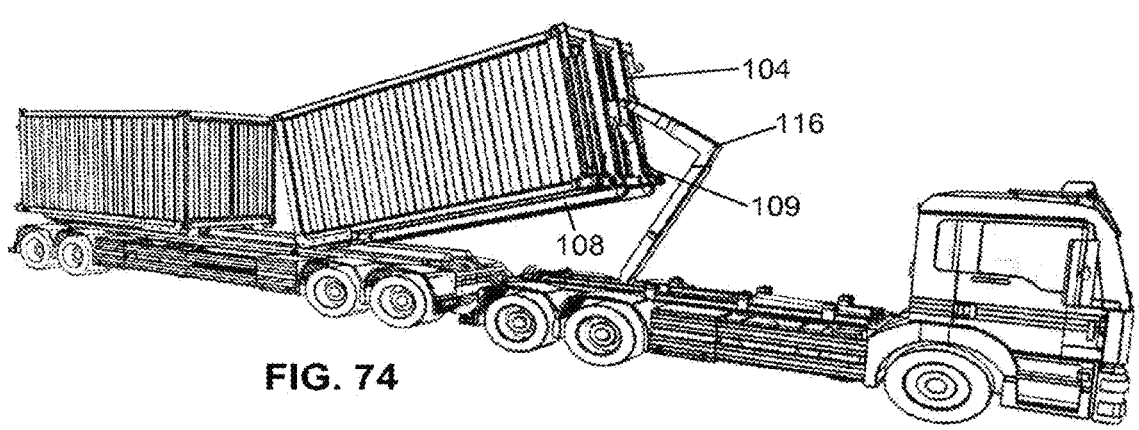

Next number of embodiments of the invention are described in more details in connection to the FIGS. 2-74, where FIGS. 2-6 illustrate a principle of an exemplary transferring device 104 of the loading arrangement 100, FIGS. 7-38 and also FIGS. 62-66 and FIG. 74 illustrate a principle of an operation of an exemplary loading arrangement 100 for loading and unloading load units 101 on and/or off the vehicle 103, and FIGS. 39-49 illustrate a principle of an operation of an exemplary frame 108 for loading and unloading load units 101 on and/or off the vehicle 103 according to an advantageous embodiment of the invention.

Figure 17:
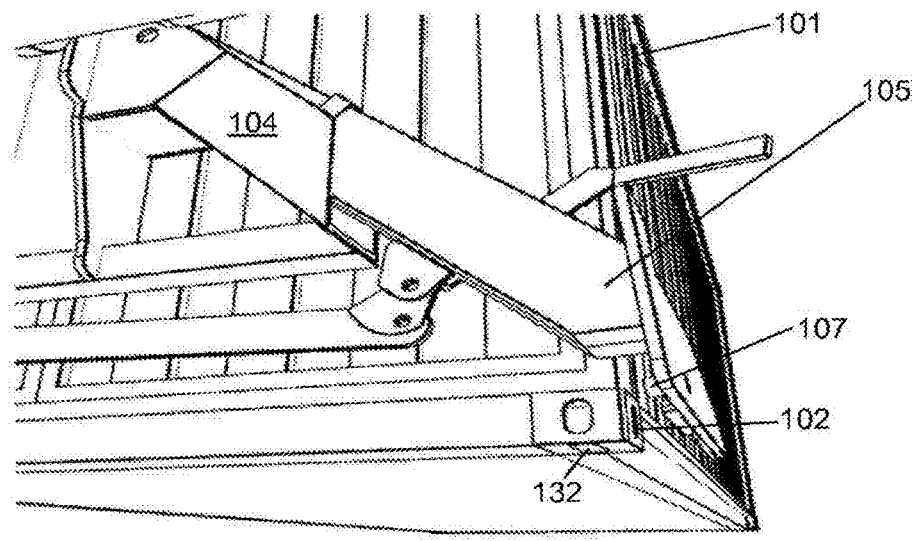

The frame 108 has first 108A and second 108B ends and is configured to be fastened to the vehicle in a detachable manner. The load unit 101 may be for example a container or sea container but is not limited to those only. The load unit 101 has first and second ends 101A, 101B, and advantageously comprises at least one fastening device. According to an example the load unit, such as the sea container, comprises at least two fastening devices in each corner of the load container. As can be seen in FIG. 17, for example, the sea container 101 comprises the fastening device in each corner of it, the fastening device having a hole in each side, the first fastening device 132 in the bottom portion and the second fastening device 102 in the side portion. The load unit 101 may naturally comprise also additional fastening devices and the inventions is not limited to these only.

The frame 108 comprises advantageously two elongated frame elements 114, 115 with first and second ends, having a longitudinal axis 117 between said ends 108A, 108B. In addition, the frame has advantageously an opening 118 between the elongated frame elements 114, 115 so that for example the hook system 116 of the vehicle 103 can be operated between said frame elements 114, 115 in the direction of said longitudinal axis 117. For example, when the 108 frame is arranged on the vehicle 103, the hook system 116 can be lifted up via the opening for loading or unloading the load unit 101 on or off the vehicle 103 so that there is no need to remove the frame, as can be seen e.g. in FIGS. 7-11.

The frame 108 comprises advantageously also a dock 109, which is arranged, such as fixed e.g. by welding or the like or fastened by a fastening means in a detachable manner, in the first end 108A of the frame 108. The dock 109 comprises advantageously a receiving portion 112 for receiving the transferring device 104 for at least loading and unloading the frame 108 on and/or off the vehicle by the transferring device 104 when the transferring device 104 is operated by the hook system 116 of the vehicle 103. The transferring device 104 may be received and fastened to the dock 109 by a suitable securing device so that when the transferring device 104 is operated by the hook system 116 of the vehicle 103, the frame 108 is also moved, such as loaded or unloaded to/from the vehicle (as can be seen e.g. in FIGS. 40-47).

In addition, the dock 109 may also be configured to receive a first end 101A of the load unit 101, when the load unit 101 is loaded on the vehicle 103. The receiving portion 112 may comprise advantageously also a locking device 113 to be fastened to a fastening device, such as to the first fastening device 132, such as the first fastening hole 132 in the underside portion of the load unit 101 in the first end 101A. In this way the first end 101A of said load unit 101 can be fastened to the frame 108 in a detachable manner, and again via the frame 108 to the vehicle 103, when the frame is fastened to the vehicle 103. However, it is to be noted that the first end 101A of said load unit 101 can be fastened to the vehicle also via the transferring device 104, or that the load unit 101 can be just caught by the transferring device 104 (operated by the hook system 116 of the vehicle 103) without specially securing the load unit to any fastening or securing device of the frame of vehicle.

Figure 71:
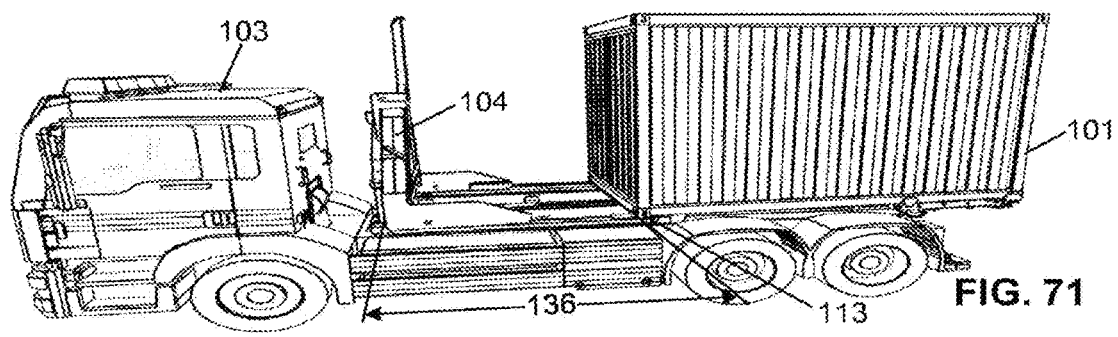
Figure 72:
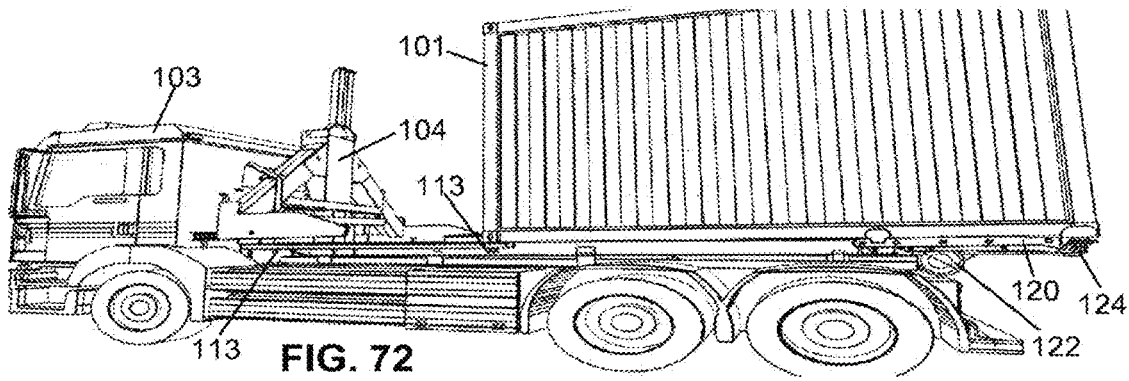
Figure 73:
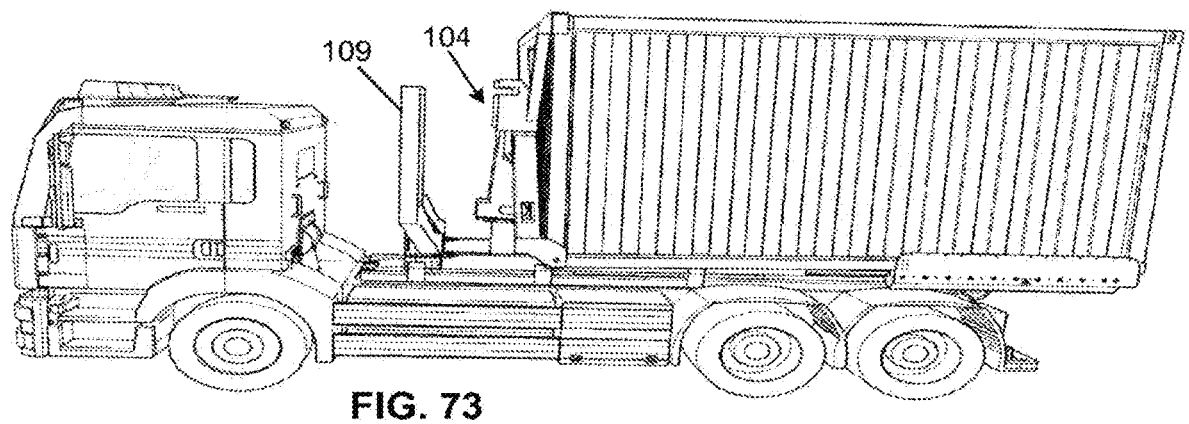

It is to be noted that the receiving portion 112 of the dock 109 may have two or more locking devices 113 in different distances 136 from the first end 108A towards the second end 108B of the frame 108 for different sizes load units 101, as can be seen e.g. in FIGS. 71, 72. In this way also smaller or shorter load units 101 can be fastened via the locking devices 113 to the frame 108 and the vehicle 103 if they are wanted to be fastened to the frame and vehicle. According to an embodiment the distance 136 of the locking device from the first end 108A is adjustable. The dock 109 may be provided e.g. suitable points for receiving the locking devices 113 in different distances. It is to be noted that the transferring device 104 can be kept fastened to the load unit 101 when the load unit 101 is loaded on the vehicle 103 and even if the load unit 101 is small or short load unit and it is not dragged to the first end 108A of the frame 108, such as is the case e.g. in FIG. 73, or the transferring device 104 can be disconnected from the load unit 101, whereupon the transferring device 104 can be dragged to the first end 108A of the frame 108 and the load unit 101 can be secured to the frame 108 via a ramp 120 and its locking devices 124 or other securing or fastening solutions, for example, such as is the case e.g. FIGS. 71-72.

The frame 108 advantageously comprises also the ramp 120, which is hinged 121 in the second end 108B of the frame 108. The ramp 120 is also configured to be hinged around a rear roller 122 of the vehicle 103. This can be implemented e.g. by locking hinge pieces 133, which are arranged around at least partly around the rear roller 122 and then fastened to the ramp 120, advantageously to the second end portion of the ramp 120, as can be seen e.g. in FIGS. 50-55. The ramp 120 can be fastened to the vehicle 103 via said rear roller 122 in a detachable manner. In addition, it is to be noted that the locking hinge pieces 133 can be fastened to the ramp for example by bolts or the like, but also controllable locking hinge pieces 133 can also be used, such as pneumatically or hydraulically closable/openable locking hinge pieces 133, which alleviates the assembling of the locking hinge pieces 133 and thus fastening and unfastening the ramp 120 and the frame 108 to the vehicle 103. In addition, also an additional fastening device 142, such as a rim screw, can be used for fastening the ramp and/or the hinge pieces 133.

Figure 10:
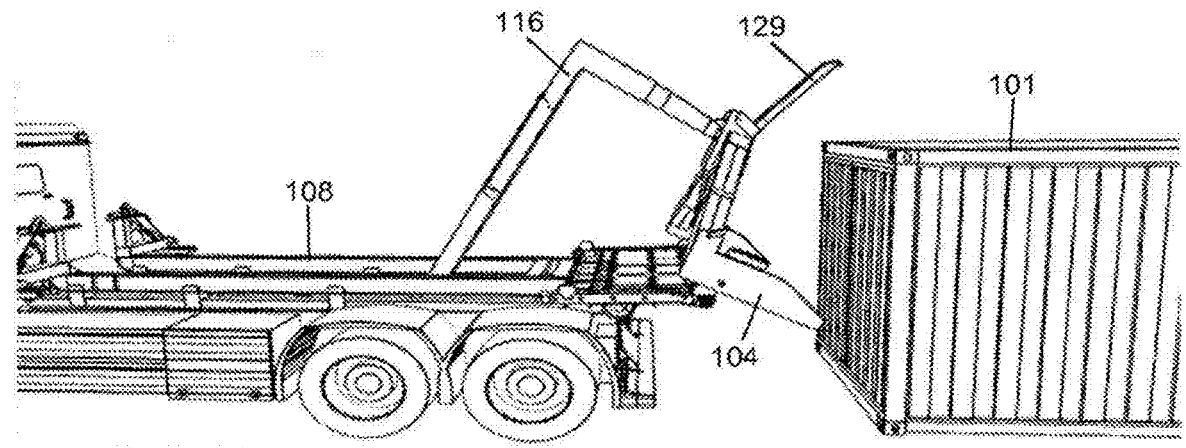
Figure 11:
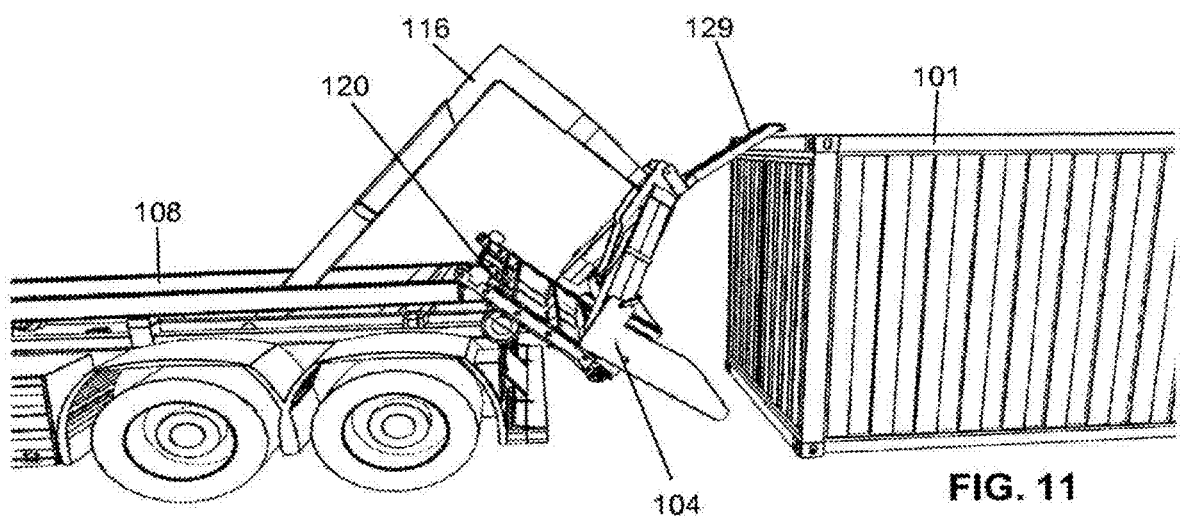
Figure 12:
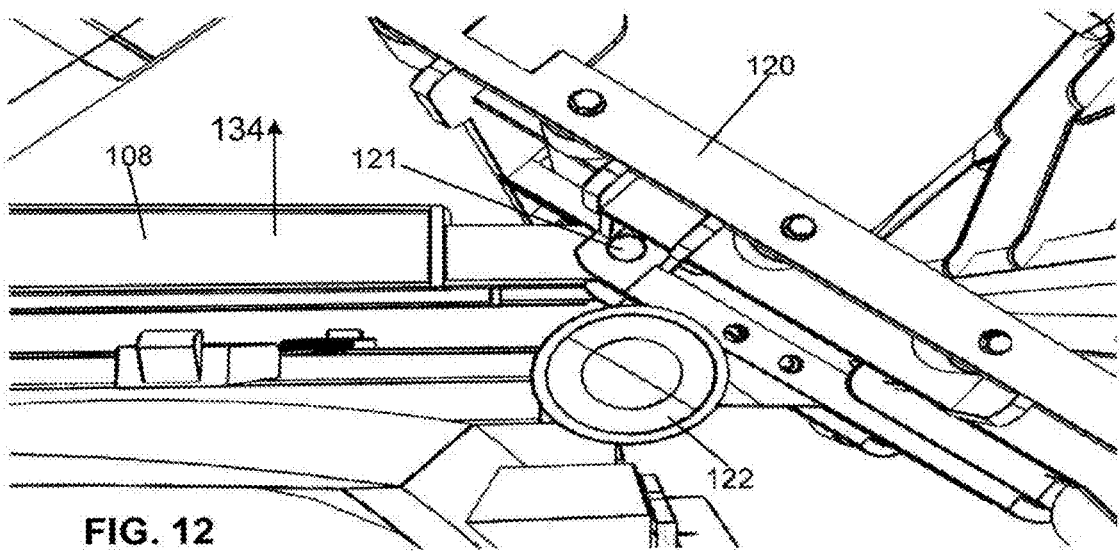
Figure 13:
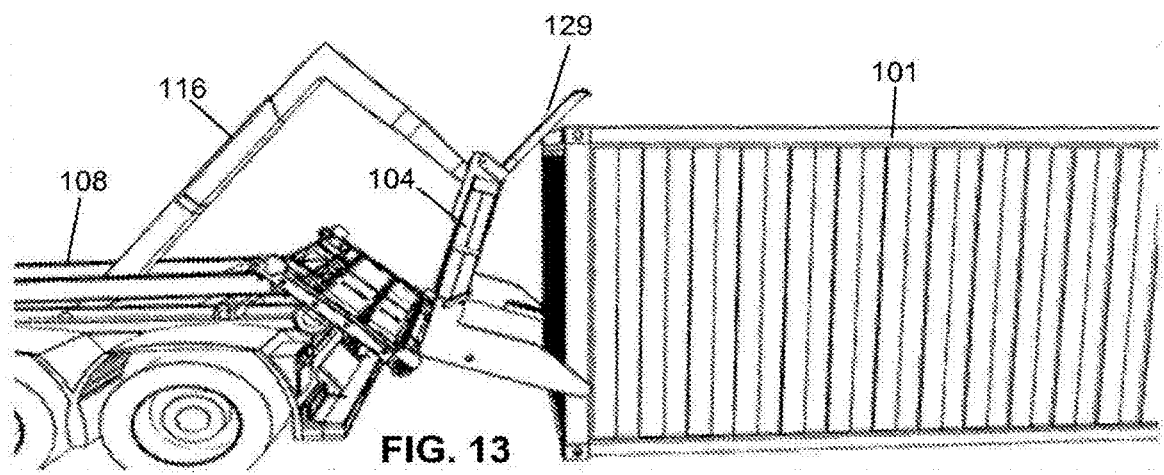
Figure 14:
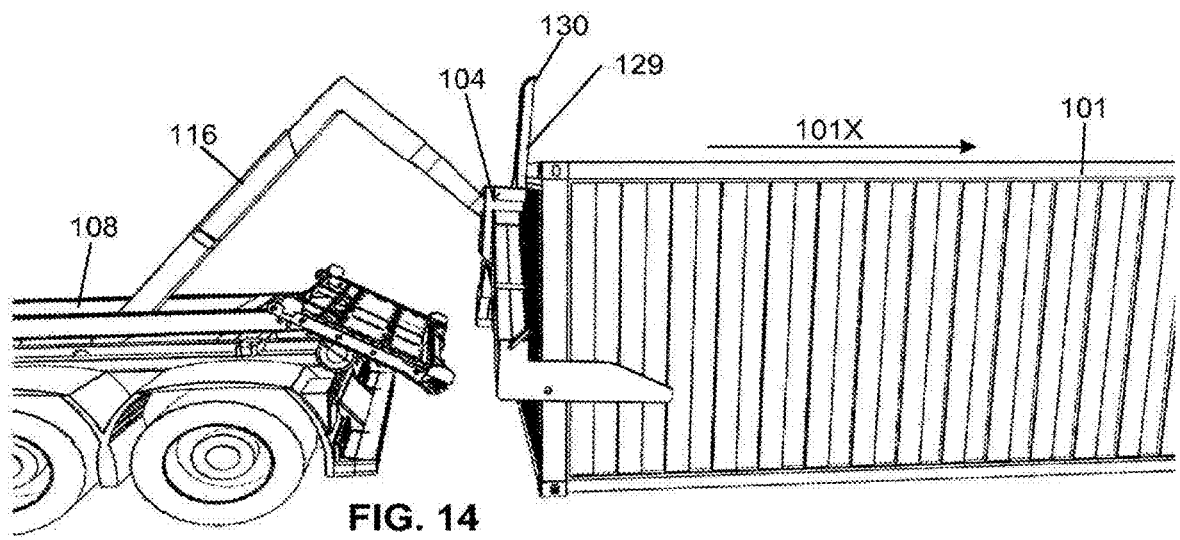

It is to be noted that the ramp 120 is both hinged to the rear roller 122 of the vehicle 103 but also to the second end 108B of the frame 108, where the hinge point 121 in the second end 108B of the frame 108 locates towards the first end 108A from the rear roller 122, when the frame 108 is mounted on the vehicle 103 and when the ramp is not tilted (such is the case e.g. in FIG. 10). Thus, when the load unit 101 is loaded or unloaded and the ramp 120 is tilted around the both hinges 121, 122, the frame moves slightly backwards (towards the second end 108B so in direction of the longitudinal axis 117). At the same the second end 108B of the frame 108 moves slightly upwards in direction 134, as can be seen in FIGS. 11 and 12. It is to be noted also, that the frame 108 is advantageously fastened to the vehicle 103 only by hinging the ramp 120 around the rear roller 122 of the vehicle so that the movement of the frame during tilting the ramp 120 can be enabled. As can be seen e.g. in FIG. 56, the frame 108 is secured to the vehicle 103 in a lateral direction 135 by introducing the elongated elements 114, 115 between securing fingers 119 of the vehicle 103. The securing fingers 119 limit the movement of the frame 108 in the lateral direction 135 but allows the movement of the frame in the vertical direction 134 (FIG. 12) being perpendicular to the lateral direction 135 and longitudinal axis 117, and allows the movement of the frame 108 in the direction of the longitudinal axis 117, when the ramp 120 is turned or tilted around the rear roller 122 and the hinge 121.

Figure 25:
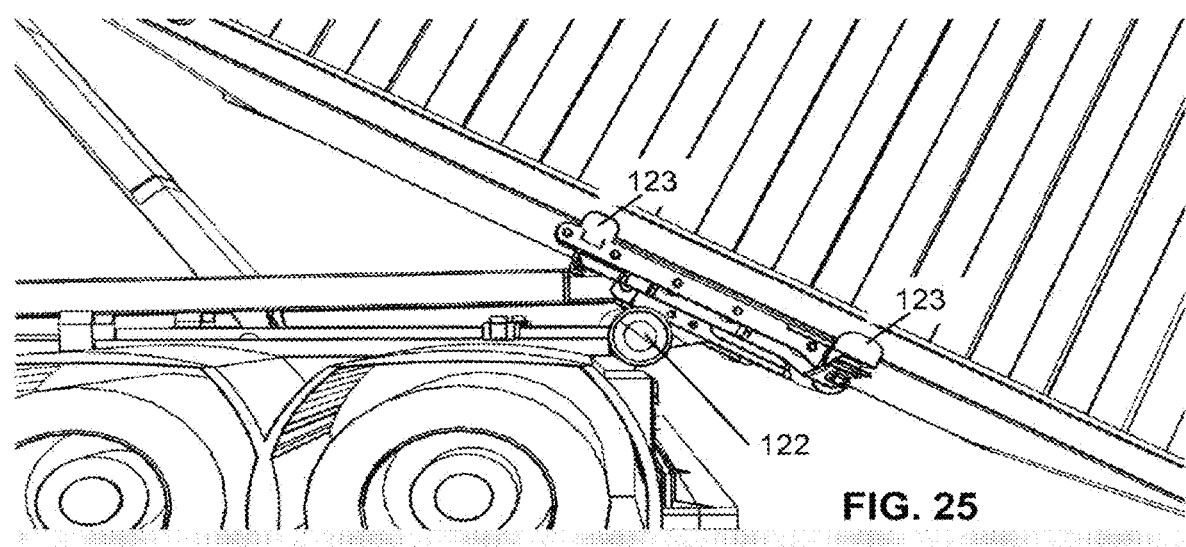
Figure 26:
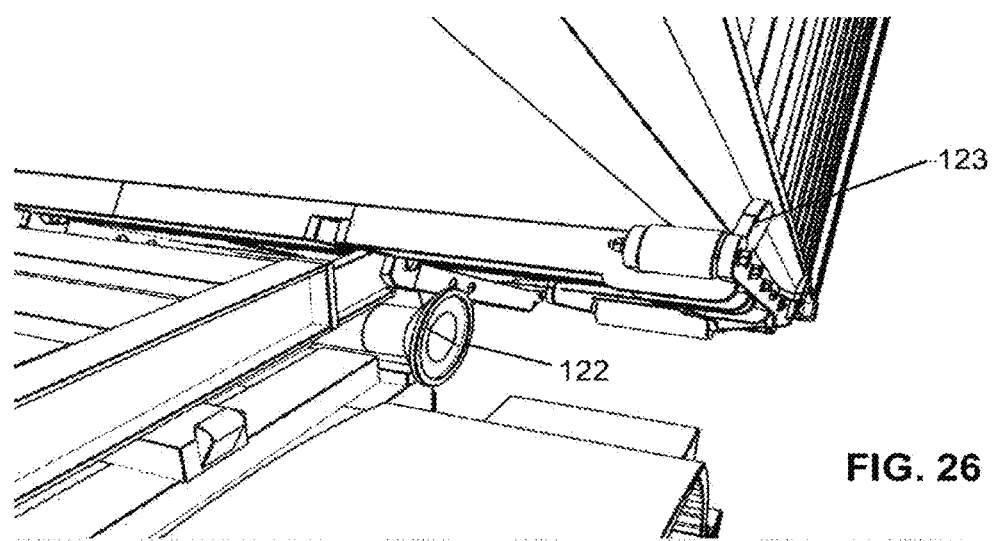
Figure 56:
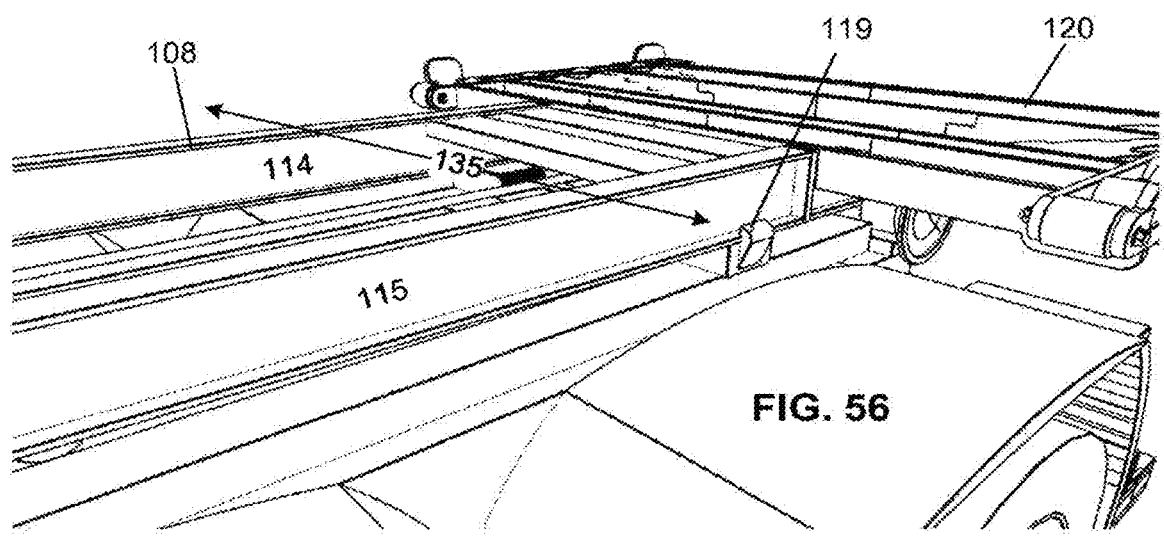
Figure 57:
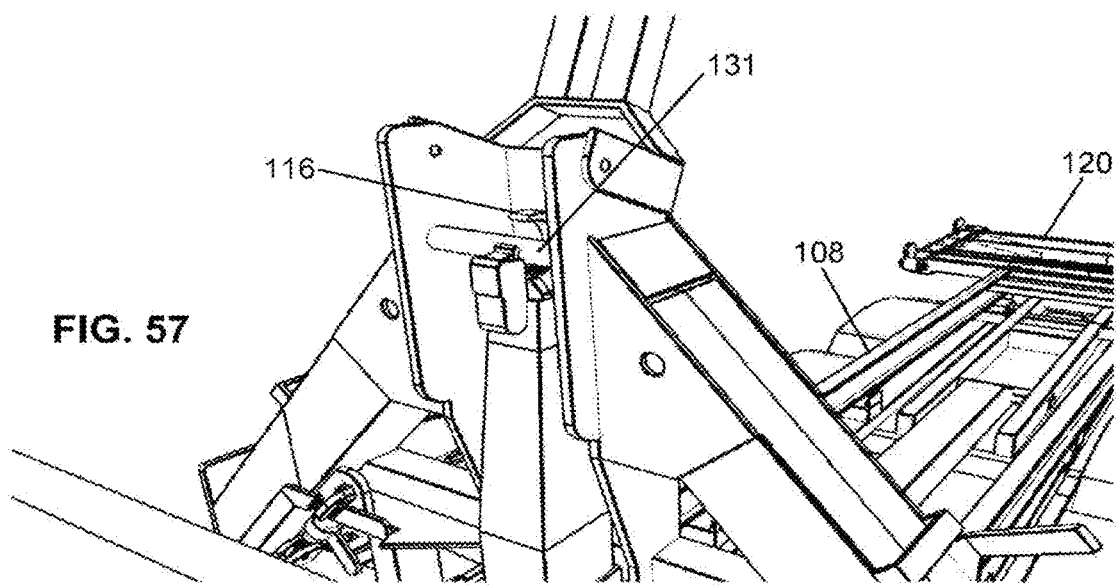
Figure 58:
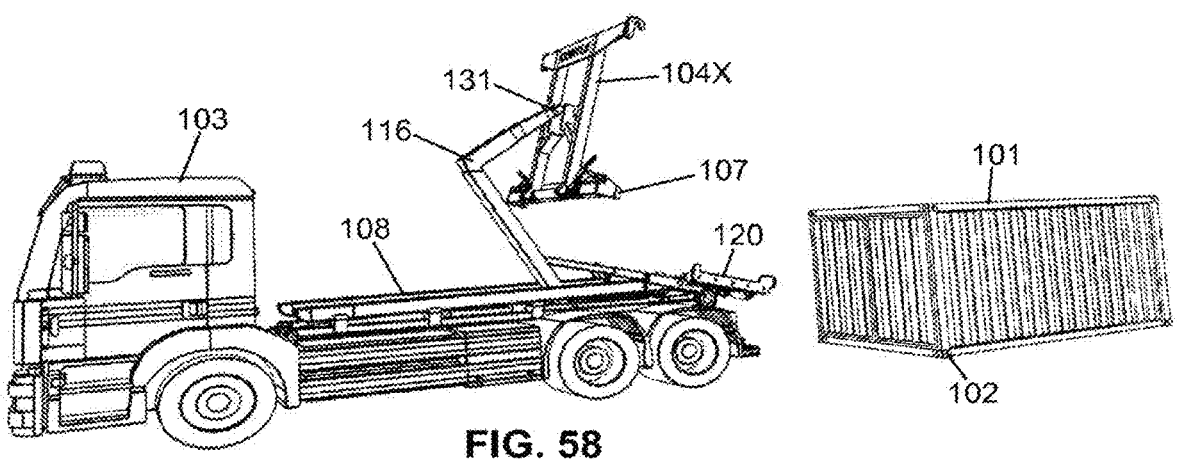
FIG. 58-61 illustrates exemplary transferring devices according to an advantageous embodiment of the invention, FIGS. 62-66—illustrate an example method and embodiments of the loading arrangement according to an advantageous embodiment of the invention, FIGS. 67-68—illustrate still an additional view of the embodiment of the loading arrangement according to an advantageous embodiment of the invention, FIGS. 69-70—illustrate an example embodiment for adjusting the loading arrangement according to an advantageous embodiment of the invention, FIGS. 71-73—illustrate example embodiments of the loading arrangement according to an advantageous embodiment of the invention, and FIG. 74—illustrates an example method and embodiment for loading and/or unloading a load unit by the loading arrangement according to an advantageous embodiment of the invention.
Figure 59:
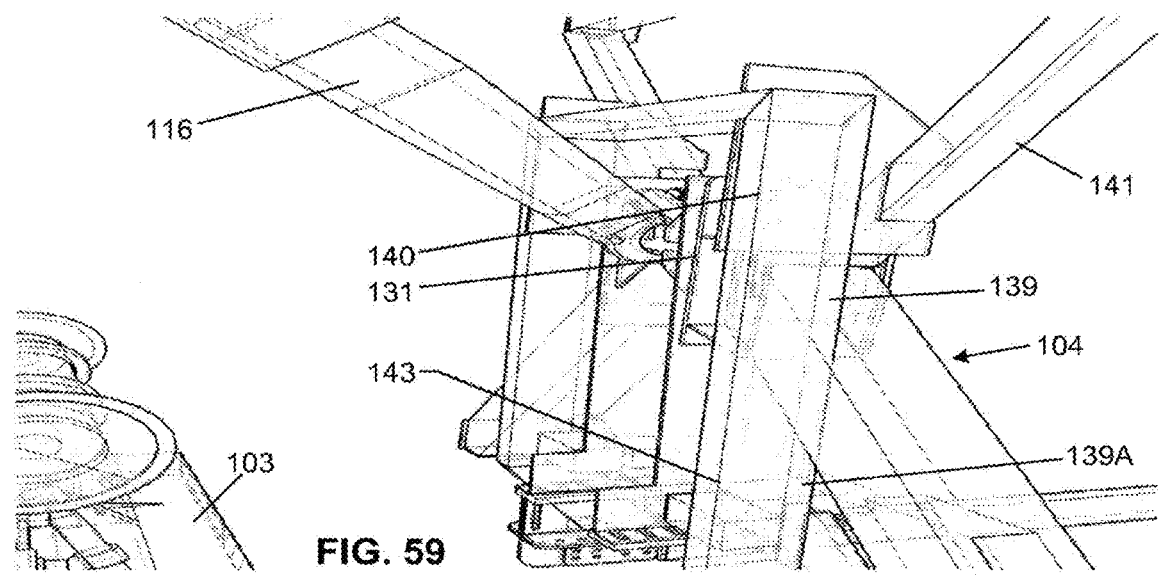
Figure 60:
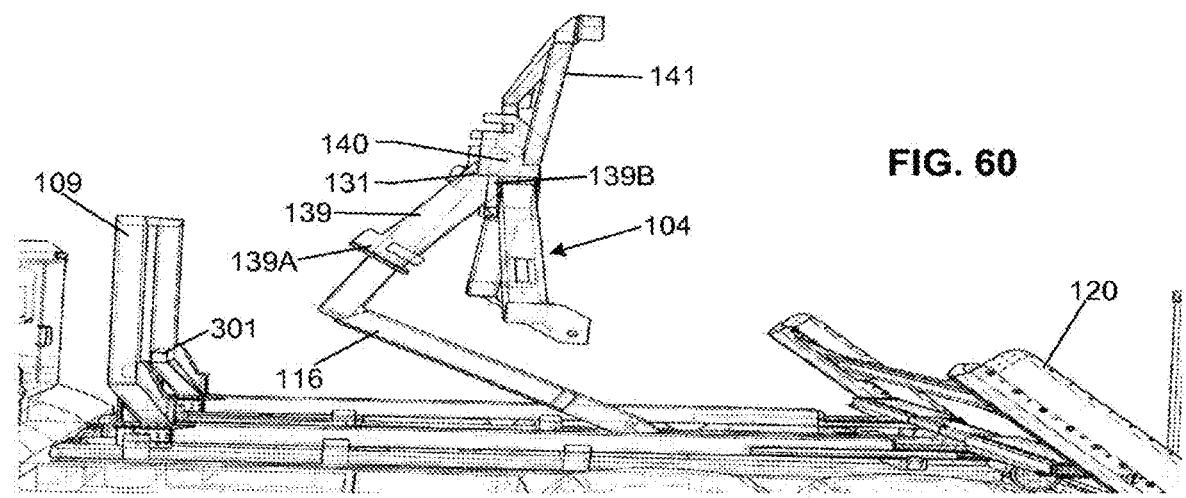

The ramp 120 may comprise guiding protrusions 123 for guiding the load unit in a lateral direction 135, so preventing the load unit 101 moving in lateral direction 135, as can be seen e.g. in FIGS. 25, 26 and 56. In addition, the ramp 120 may comprise a locking device 124 to be introduced to an additional, e.g. a third, fastening device 125, such as a hole 125 in the underside portion in the second end 101B of the load unit 101, as can be seen e.g. in FIGS. 28-30. The locking device 124 of the ramp 120 is fastened to the third fastening device 125 in the second end 101B of the load unit 101, whereupon the load unit 101 is fastened to the frame 108 and again to the vehicle 103 also from the second end 101B of the load unit.

The arrangement 100 comprises in addition said transferring device 104 for catching and transferring the load unit 101 on and/or off the vehicle 103. The transferring device 104 comprises advantageously a catching device 107 for catching the load unit 101 via the fastening device 102, 132 of the load unit. The catching device 107 illustrated in Figures is a pin or plug, depending on the type of the fastening device of the load unit. For example, the fastening device of the typical sea container is a hole (at least two holes pointing different sides in each corner, so first and second fastening devices, as can be seen e.g. in FIG. 17), whereupon the catching device 107 is a plug. Naturally, the catching device 107 can be implemented also on other ways so that is it suitable for the fastening devices of the load unit in questions. In addition, according to an embodiment, the catching device 107 can be operated, such as closed and/or opened to/from the fastening device of the load unit remotely e.g. in hydraulically, pneumatically, electrically or the like manners known by the skilled person.

The transferring device 104 comprises also a gripping point 131 (as can be seen in FIG. 57, 59-66, for example) to be gripped by the hook system 116 of the vehicle 103. Thus, when the catching device 107 is fastened to the fastening device 102, 132 of the load unit 101, the load unit can be transferred, such as loaded or unloaded on or off the vehicle 103 by transferring device 104. For transferring the load unit 101 the transferring device 104 is operated by the hook system 116 of the vehicle 103. It is to be noted that in this way also the typical sea container can be loaded to the vehicle with the conventional type skip system, as can be seen e.g. in FIGS. 13-32.

The dock 109 comprises a securing device 110 for securing the transferring device 104 to the frame 108 in a detachable manner. The exemplary securing device 110 in Figures (e.g. in FIGS. 2-4) is a hook or a rim screw, which can be fastened to a corresponding groove 111 in the transferring device 104.

FIGS. 2-6 and 59-66, for example, illustrate an exemplary transferring device 104, wherein the transferring device 104 comprises two elongated arms 105. At least one, preferably both, are joined to the transferring device 104 via a hinge 106 in a proximal end 105A of the arms 105 so that the longitudinal axis 105C of the two elongated arms form an angle (a). The longitudinal axis points advantageously downward angle. The angle between the arms is advantageously less than 180°, for example less than 130°, or less than 110° or more advantageously 90°, however depending on the implementation of the transferring device 104.

The arms 105 comprise the catching devices 107 advantageously in the distal ends 105B of the arms. The catching devices 107 project advantageously inwards and towards the distal end of another elongated arm so towards the load unit 101 side and the fastening device 102, 132 of the load unit in use, advantageously to the second fastening device 102 locating on the side of the load unit.

Figure 18:
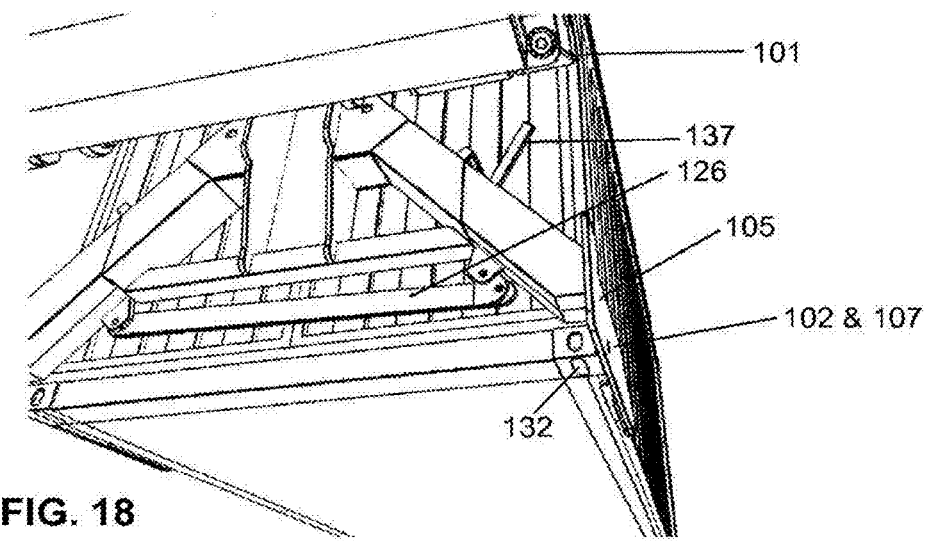

The transferring device 104 has open and closed positions (see e.g. FIGS. 17 and 18). In the open position (FIG. 17) the angle (a) between the two elongated arms 105 is bigger than in said closed position (FIG. 18). In the open position the catching devices 107 are configured to be introduced to/from said fastening device 102, 132 of the load unit 101 so that the transferring device 104 can be delivered around the sides of the first end 101A of the load unit 101. In the closed position the catching devices 107 are configured to be pushed/fastened or otherwise introduced into the fastening device 102, 132 of the load unit, or locking holes 102, 132 in the case of the sea container, as is the case in FIG. 18, for example.

The exemplary the transferring device 104 comprises an operable connecting rod 126 arranged between the two elongated arms 105, as can be seen in FIGS. 5, 6, 17-19, for example. The connecting rod 126 can be operated e.g. by the operating handle 138. The connecting rod 126 is arranged to the distal portions 105B of the arms so that the transferring device 104 can be opened to the opening position by separating the distal ends 105B of the elongated arms 105 apart from each other by operating the connecting rod 126. Correspondingly the transferring device 104 can be closed to the closed position by moving the distal ends 105B of the elongated arms 105 towards each other by operating the connecting rod 126. The connecting rod 126 may be operated manually, pneumatically or hydraulically or even electric motors or servos can be used.

Figure 19:
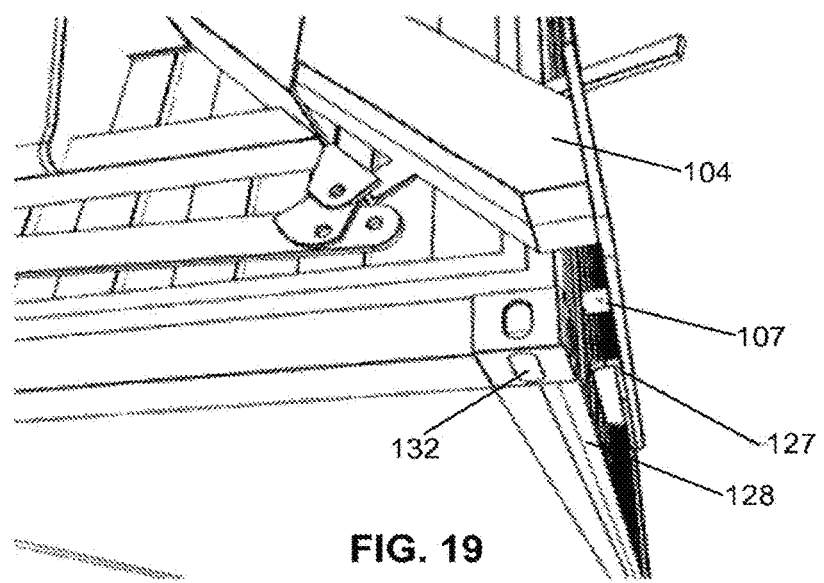

The two elongated arms 105 of the transferring device 104 comprises advantageously also supporting projections 127, as can be seen in FIG. 19, for example. The supporting projections 127 are arranged in the distal ends 105B of the arms 105 next to the catching devices 107, projecting inwards and towards the distal end 105B of another elongated arm 105 so towards the load unit 101 side in use. The supporting projections 127 are introduced to corresponding grooves 128 in the bottom portion of the load unit 101. The supporting projections 127 support the load unit 101 from below portion of the load unit 101, when the transferring device 104 is closed in the closed position, thus preventing for example lateral twist of the load unit 101 during loading the load unit 101 on the vehicle 103.

In addition, in some embodiments, such as illustrated e.g. in FIGS. 59-67 the transferring device 104 comprises in addition to said two elongated hinged arms 105 a gripping member 141 configured to grip the load unit in an opposite side, so in an upper side, than said two elongated hinged arms 105, which are gripping the load unit in the lower or bottom side. The gripping member 141 may be fixed gripping member so that the opening angle is not adjustable, whereupon the gripping member 141 advantageously comprises catching devices which are configured to be introduced to upper side catching holes of the load unit (in the upper corners). In some embodiments the arms of the gripping member 141 may be implemented by telescopic arms so that the length of the arms of the gripping member 141 are adjustable for the load size. However, still the angle between the arms of the gripping member 141 may be fixed or adjustable.

In addition, in some embodiments the transferring device 104 may also comprise a guiding boom 129, as can be seen e.g. in FIGS. 10, 11, 13-16. The guiding boom 129 is arranged or hinged to the upper portion of the transferring device 104 so that the free end of the guiding boom 129 is configured to be introduced to the upper portion of the load unit 101 when the transferring device 104 is moved towards the load unit 101. The guiding boom 129 is configured to guide the transferring device 104 so that the longitudinal axis of said two elongated arms and a vertical axes of the transferring device 104 are essentially perpendicular to a longitudinal axis 101X of the load unit 101, as is the case in FIG. 14, for example.

The guiding boom 129 may also comprise a stopping member 130 in the free end of it, such as an outward projection so that when the guiding boom 129 guides the transferring device 104 in a vertical direction, the stopping member 130 prevents and stops the movements of the transferring device 104 in the vertical direction when the stopping member 130 meets the upper portion of the load unit 101. In this way the guiding boom 129 targets the catching devices 107 at the right position of the fastening hole 102 of the load unit 101.

The transferring device 104 may also comprise or coupled with an elongated boom 139 having first and second ends 139A, 139B, as can be seen in FIGS. 59-66, for example. The elongated boom 139 is advantageously coupled with the transferring device 104 via a joint or levelling point 140, which is arranged in the second end 139B of the elongated boom 139. The elongated boom 139 comprises also the gripping point 131 to be gripped by the hook system 116 of the vehicle 103. The gripping point 131 is arranged next to the joint 140 to the second end 139B of the elongated boom 139 and towards the first end 139A of the elongated boom 139 from the gripping point 131. The movement of the elongated boom 139 is limited around the joint 140 at least during loading and/or unloading the load unit 101 on or off the vehicle 103 by supporting the first end 139A of the elongated boom 139 to the hook system 116 of the vehicle, advantageously to a boom of the hook system. Thus, when the joint or levelling point 140 locates closer to the second end 139B of the elongated boom 139 than the gripping point 131, it balances (due to gravity) a position and possible swinging of the transferring device 104 when it is moved e.g. towards the load unit 101 for catching it, such as is the case e.g. in FIG. 60. This helps the operation of the transferring device 104, because it does not swing so easily and is thus easier to couple with the load unit for catching it. In addition, the elongated boom 139 functions as a lever arm and supports the first end 139A (bottom portion of it) of the elongated boom 139 to the boom of the hook system 116 of the vehicle during loading/unloading the load unit 101 by the transferring device, as can be seen e.g. in FIGS. 60-66. This allows more optimal position and angle to the hook system 116 for lifting the load unit during loading/unloading, namely the gripping point 131 can be arranged in a higher level in this way due to the elongated boom 139 and the mutual locations of the gripping point 131 and the joint 140. Otherwise, the gripping point 131 will be in a lower level and beyond the dead angle of the hook system 116, whereupon the lifting of the load unit e.g. during loading is easier and does not requires so much power of the hook system 116.

Thus, due to the relational arrangement of the gripping point 131 and the joint 140 the transferring device 104 can be balanced so that it does not swing so much when it is moved by the hook system 116 of the vehicle, which smoothens to settle the transferring device 104 to the load unit 101 for catching it.

The arrangement comprises also a mechanical limiting member 143 for limiting the movement of the elongated boom 139 around the joint 140 during loading and/or unloading the frame 108 on or off the vehicle 103 by the transferring device 104. Advantageously the limiting member 143 secures the first end 139A of the elongated boom 139 to the frame structure 108 or to the dock 109 of the frame so that when the frame 108 is loaded/unloaded on or off the vehicle 103 by the transferring device 104, the elongated boom 139 does not swing or move, as is the case in FIG. 59 where the frame 108 locates on the ground and the first end 139A of the elongated boom 139 is secured to the frame structure 108 and after which the frame 108 can be e.g. loaded to the vehicle by operating the transferring device 104 by the hook system 116 of the vehicle. The limiting member 143 can be implemented e.g. by a suitable slot or groove in the first end 139A of the elongated boom 139 so that the slot or groove meets the corresponding shoulder or the like in the dock 109 or other portion of the frame 108.

Figure 61:
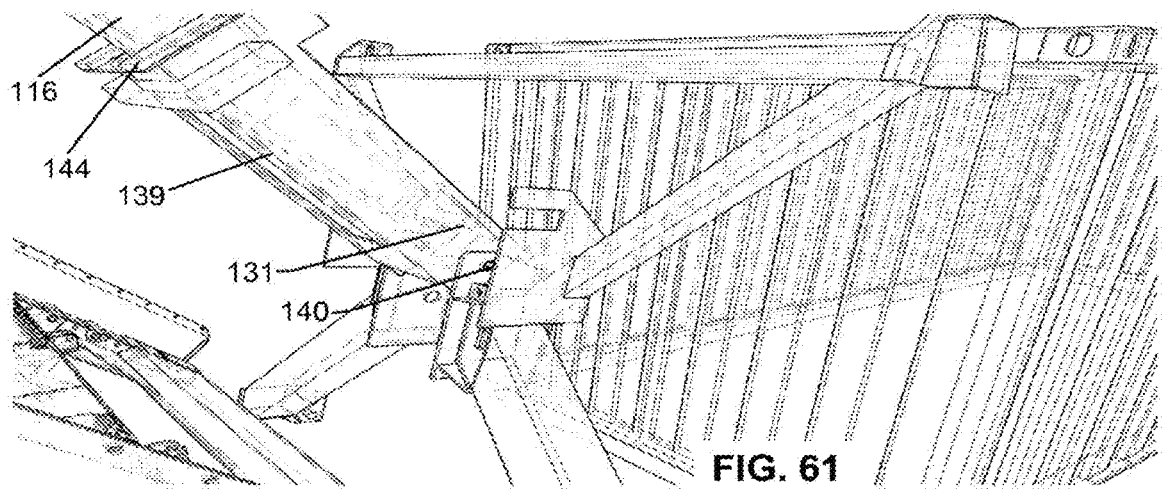
Figure 62:
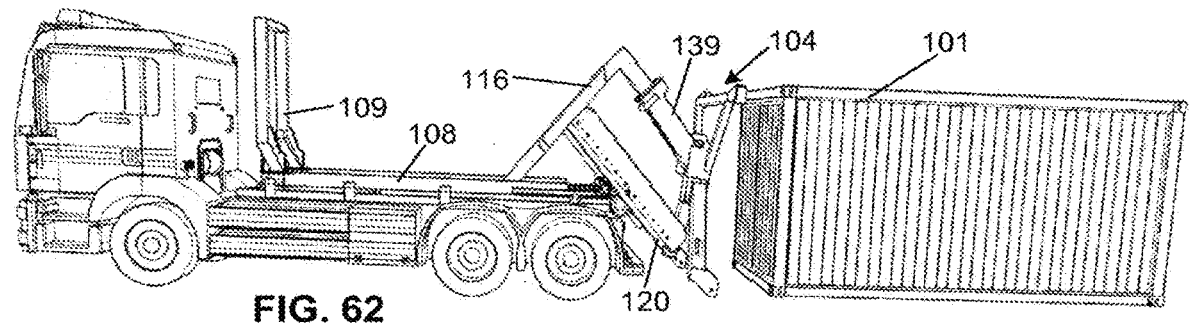
Figure 63:
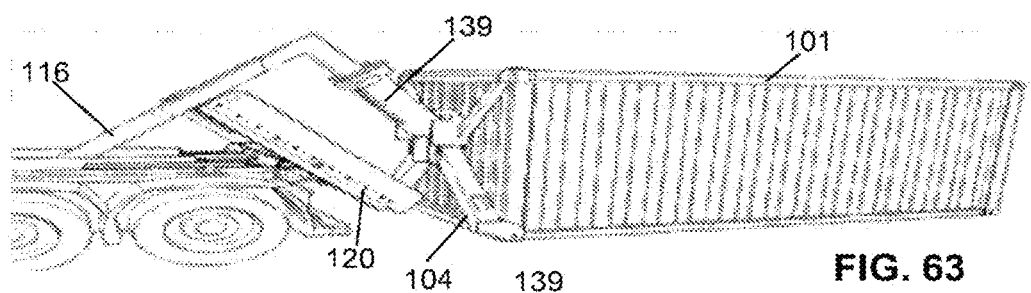
Figure 64:
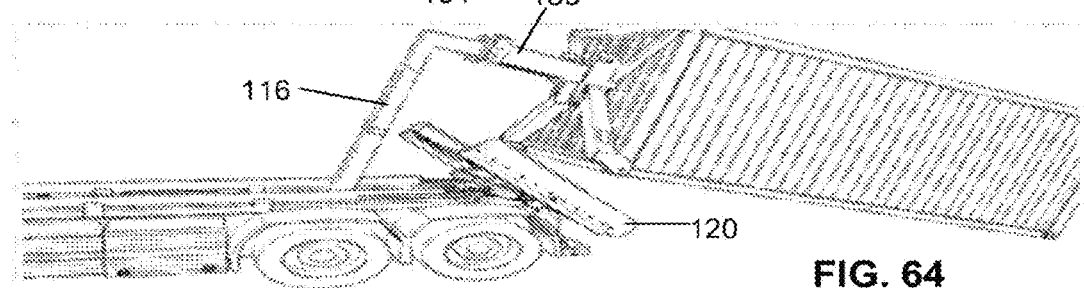
Figure 65:
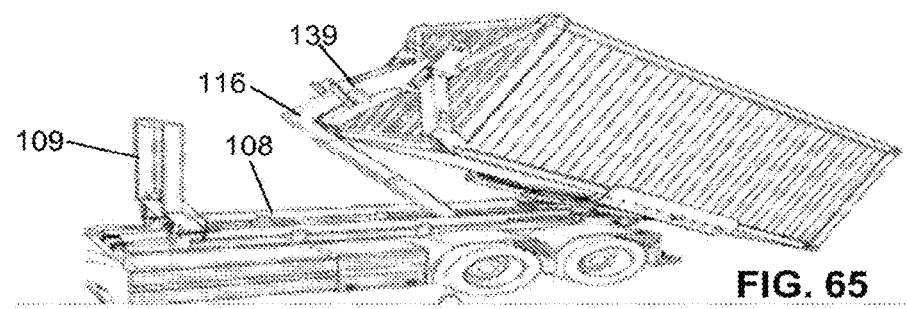
Figure 66:
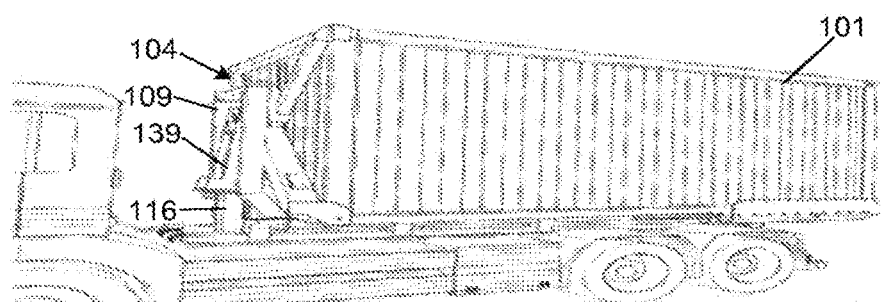
Figure 67:
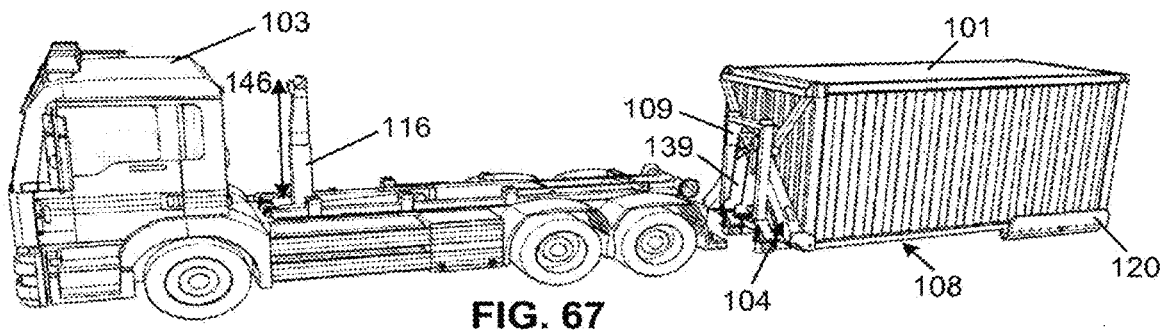
Figure 68:
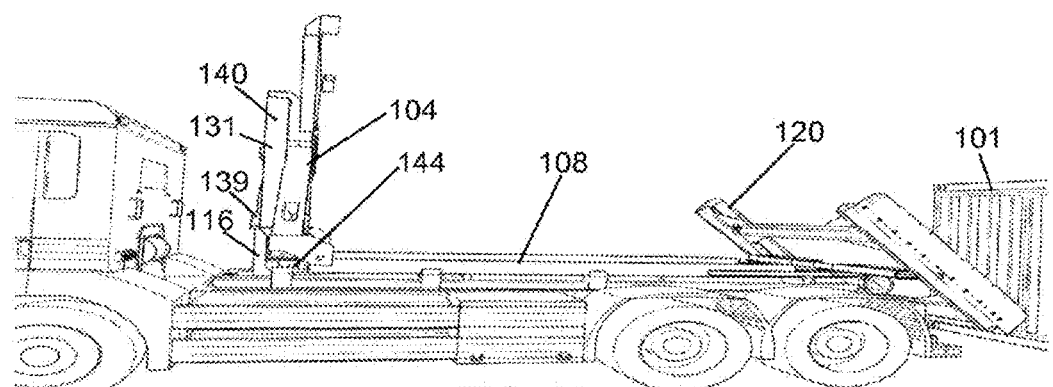

Still in addition, the arrangement may comprise an adjusting member 144 for reduce or expand the inner size of the elongated boom 139 so that it can be fitted tightly around the different size boom of the hook systems 116, as can be seen in FIG. 61, for example. According to an example the adjusting member 144 can be provided by a spring element or with flexible rubber element so to fit the adjusting member 144 better and tightly against the boom of the hook systems 116 and also thereby relieving mechanical stresses and torques caused by the relational movement of the elongated boom 139 and the hook systems 116, for example.

Figure 7:
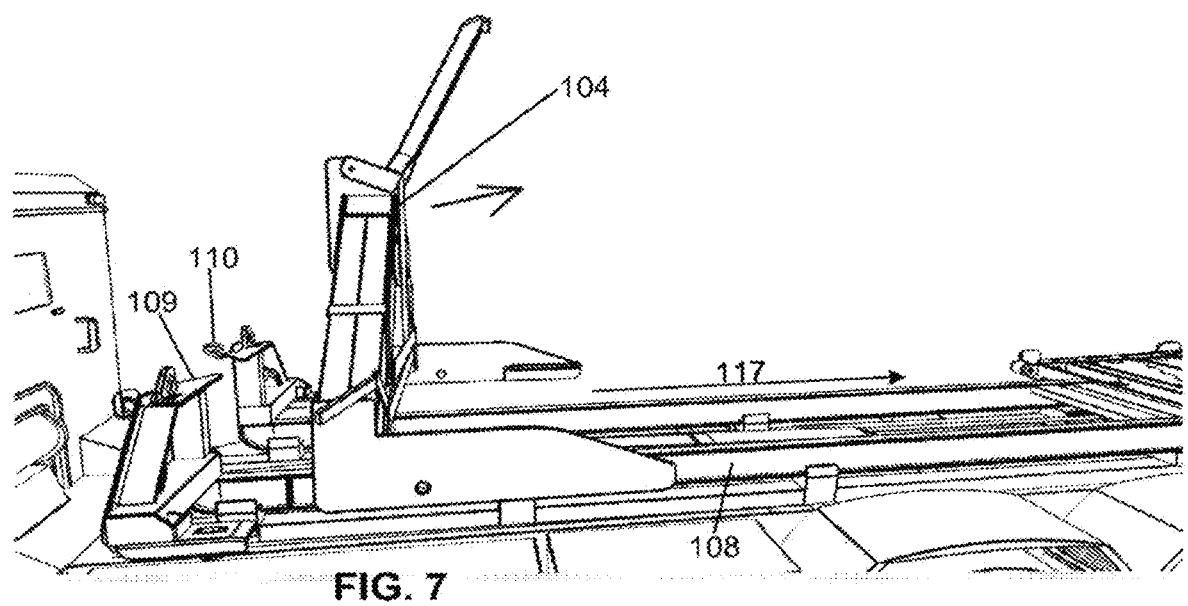
FIGS. 7-38 illustrate a principle of an operation of an exemplary loading arrangement for loading and unloading load units on and/or off a vehicle according to an advantageous embodiment of the invention.
Figure 8:
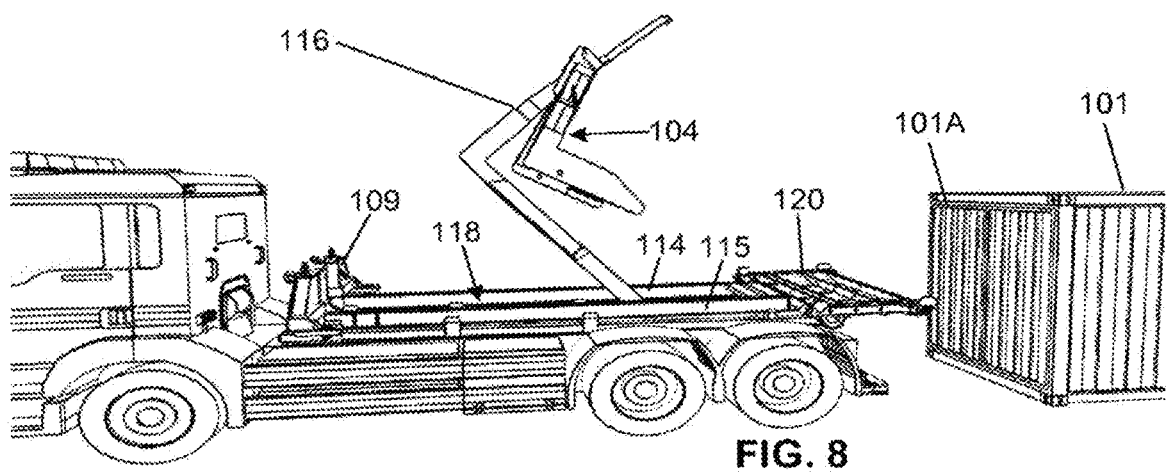
Figure 9:
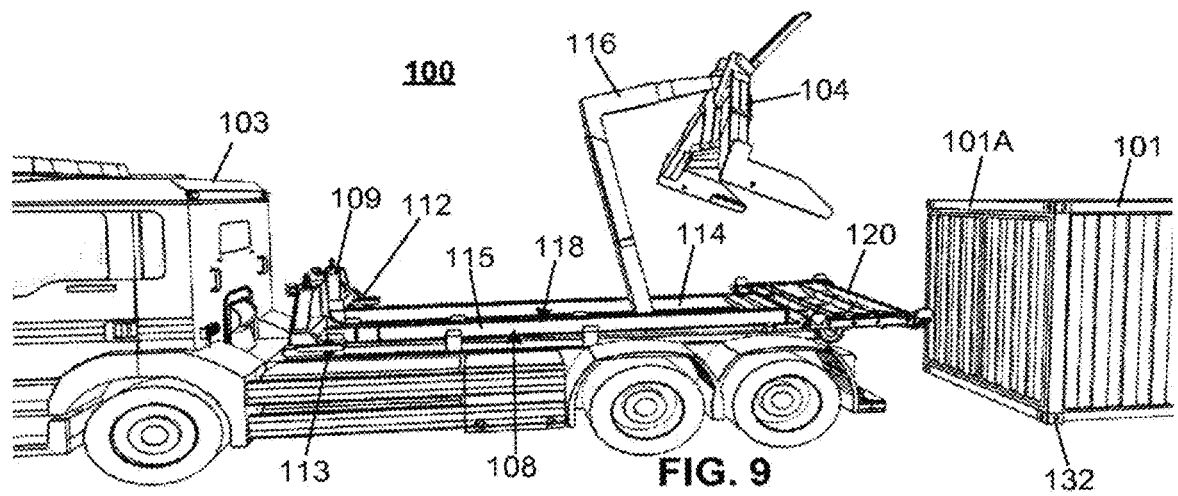

The operation of the arrangement 100, in particularly the frame 108 and exemplary transferring device 104 can be seen in Figures, and in particularly in FIGS. 7-32, 59-66 and 73, wherein e.g. in FIG. 7 the transferring device 104 is gripped by the hook system 116 of the vehicle 103. The hook system 116 is gripped around the gripping point 131, whereupon the transferring device 104 can be moved backwards (when the securing device 110 of the dock 109 is opened, as is the case e.g. in FIG. 3) and towards the load unit 101 lying on the ground, as can be seen e.g. in FIGS. 8-11 and 62-63. The movement of the hook system 116 is done in the opening 118 between the elongated frame elements 114, 115.

Figure 15:
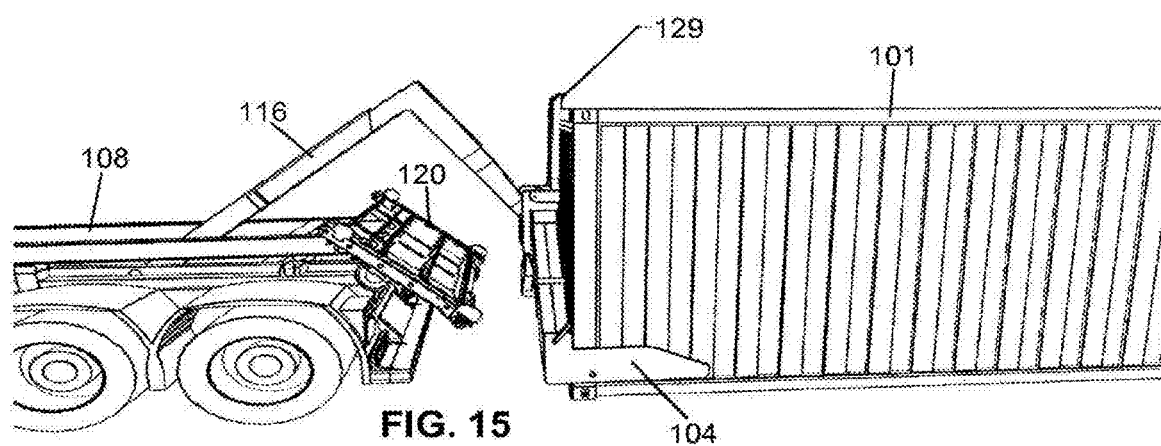
Figure 16:
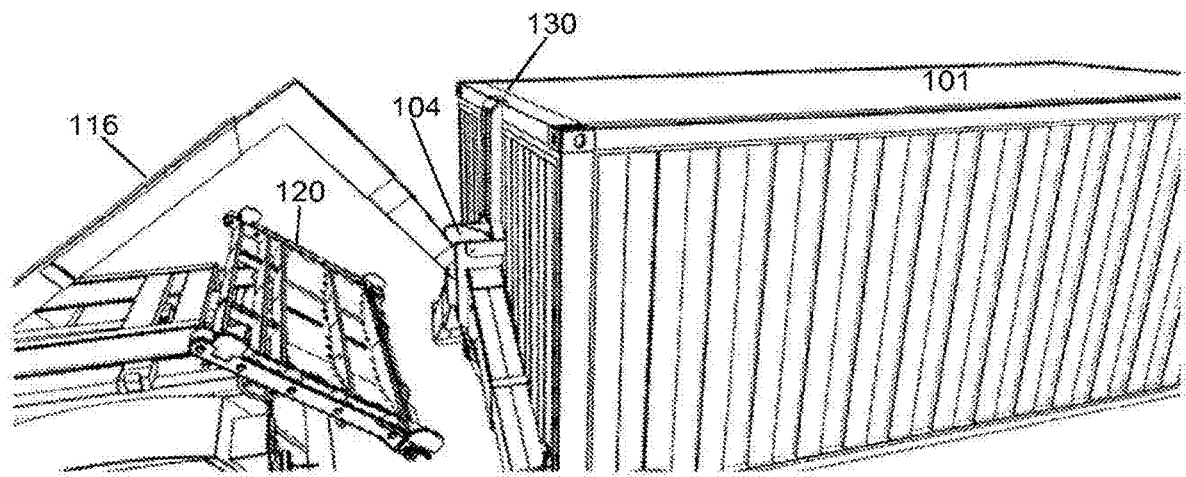
Figure 20:
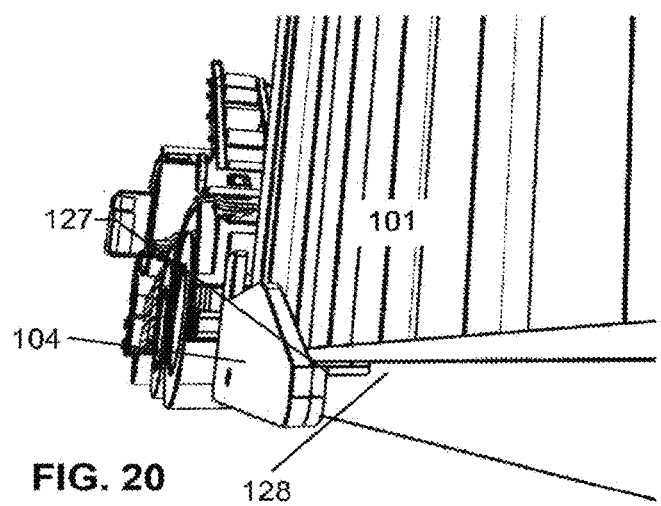
Figure 21:
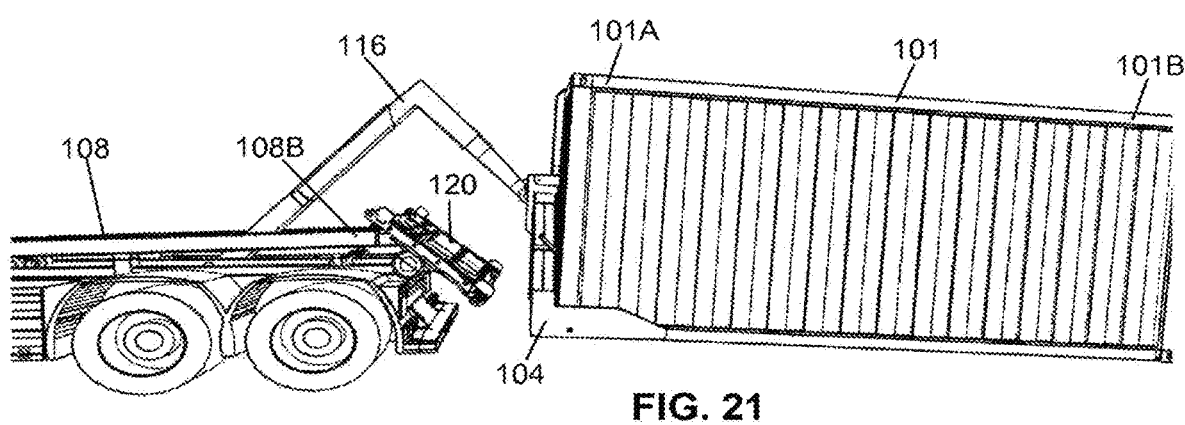
Figure 22:
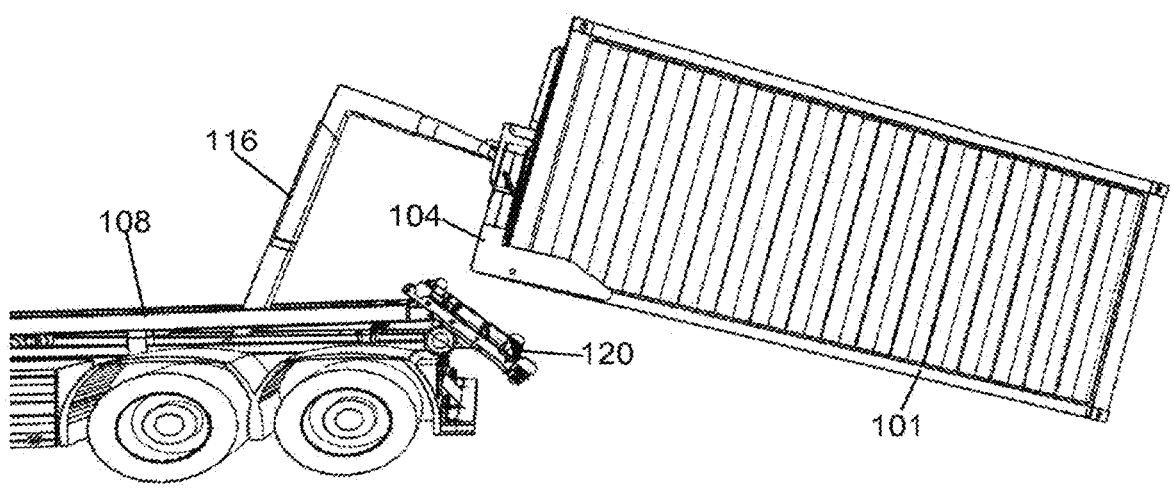
Figure 23:
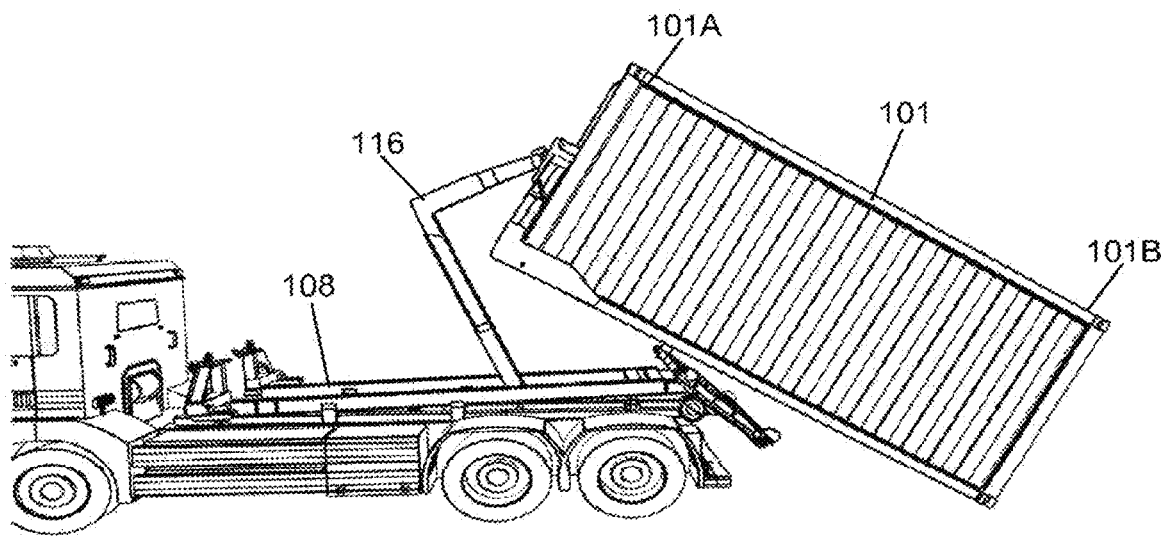
Figure 24:
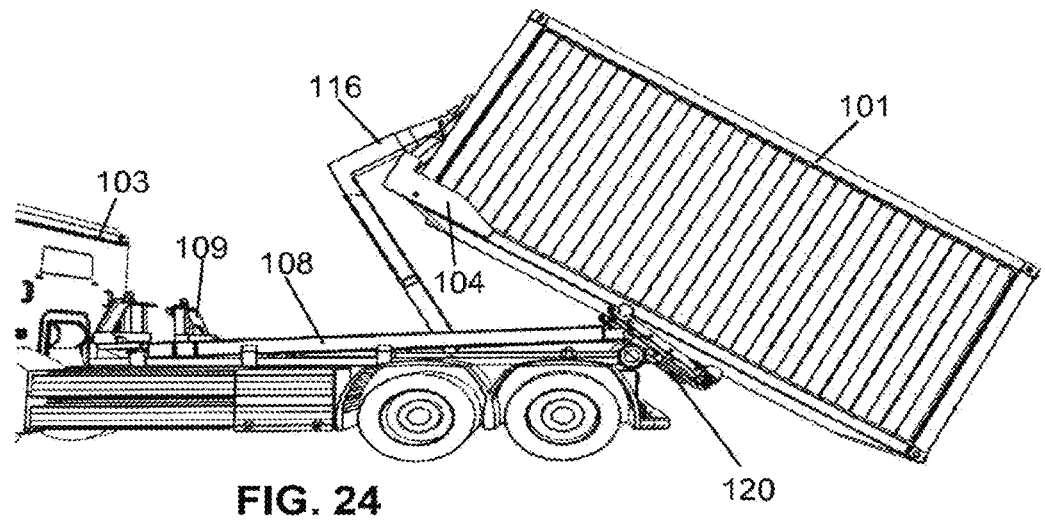

When the transferring device 104 reaches the first end 101A of the load unit, the guiding boom 129 (if used) meets the upper portion of first end 101A and when the transferring device 104 is moved further, so downwards, the guiding boom 129 guides the transferring device 104 in the right position (as can be seen in FIGS. 10, 11, 13, 14) and the stopping member 130 finally prevents and stops the movements of the transferring device 104 (as can be seen in FIGS. 15, 16) so that the catching devices 107 of the transferring device 104 is at the right position in relation to the fastening hole 102 of the load unit 101. It is to be noted that when the transferring device 104 is moved to the first end 101A of the load unit 101, the transferring device 104 must be in open position so that it can be moved around the sides of the load unit 101, as is the case in FIG. 17. When the transferring device 104 and the catching devices 107 are in the right position, the transferring device 104 can be closed to the closed position, as is the case in FIG. 18. As can be seen in FIGS. 19, 20, the supporting projections 127 are also introduced to corresponding grooves 128, when the transferring device 104 is closed to the closed position.

When the transferring device 104 is moved backwards, it is configured to meet also the ramp 120 and tilt to the position for receiving the load unit 101 to be loaded on the vehicle 103, as is the case in FIG. 12.

Figure 27:
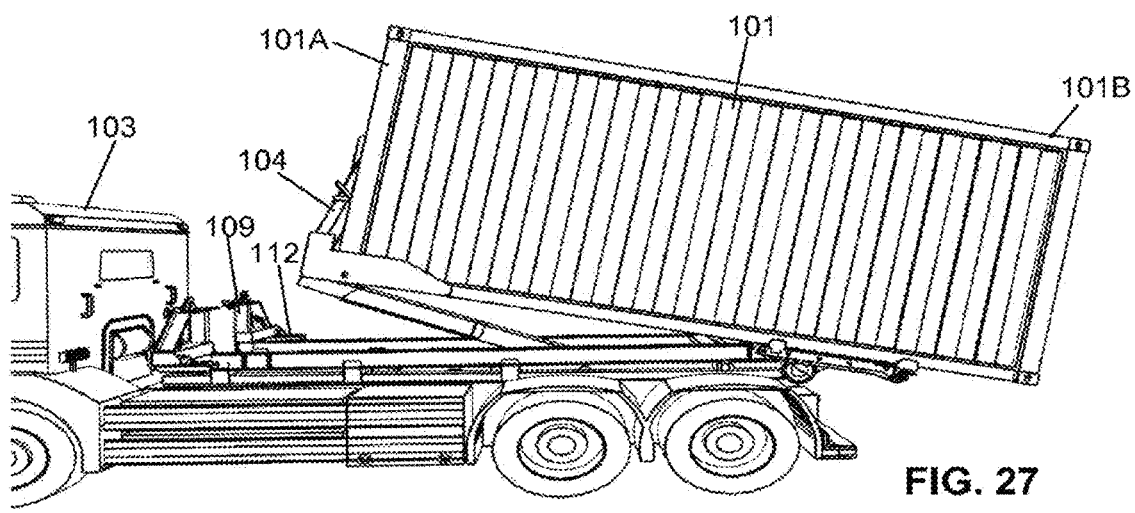
Figure 28:
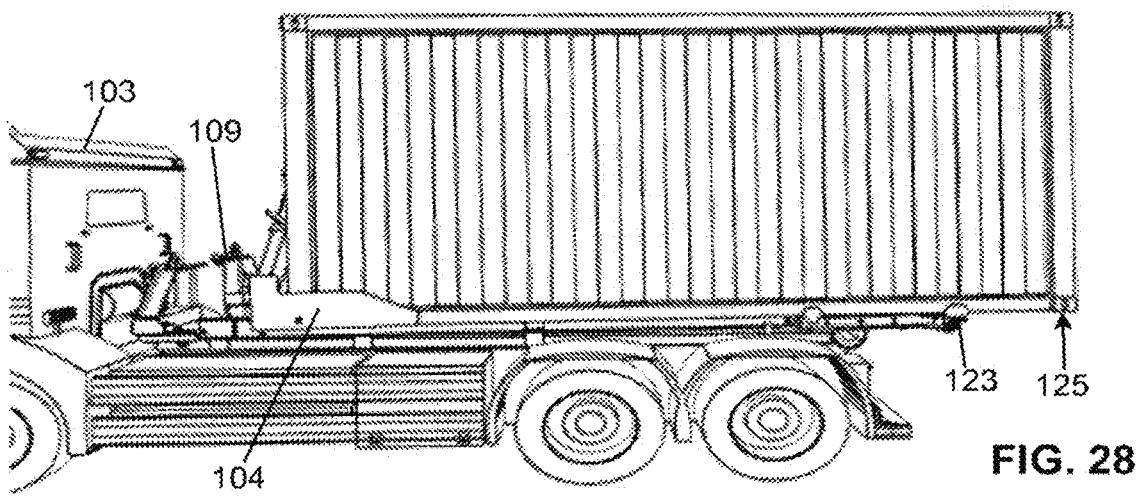
Figure 29:
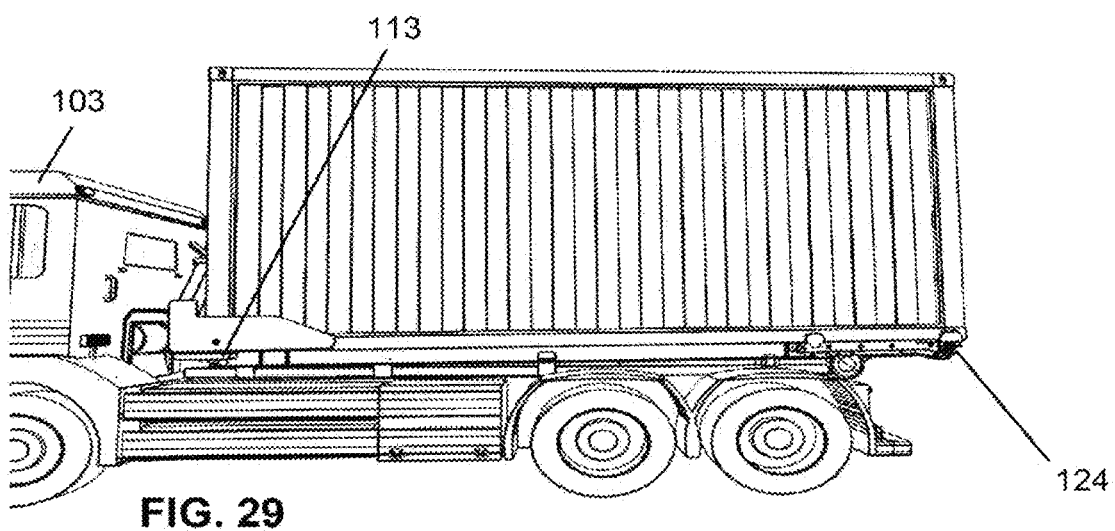
Figure 30:
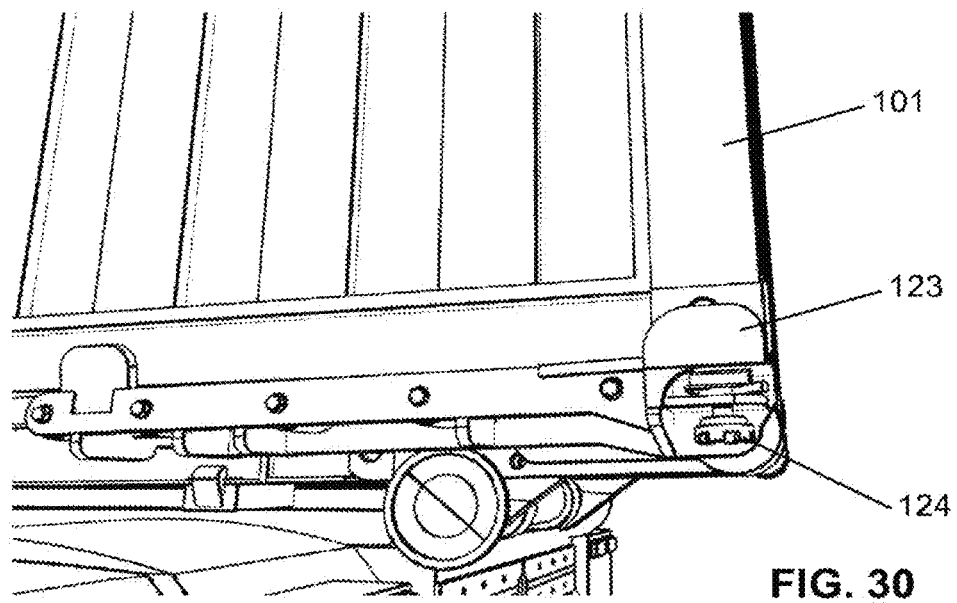
Figure 31:
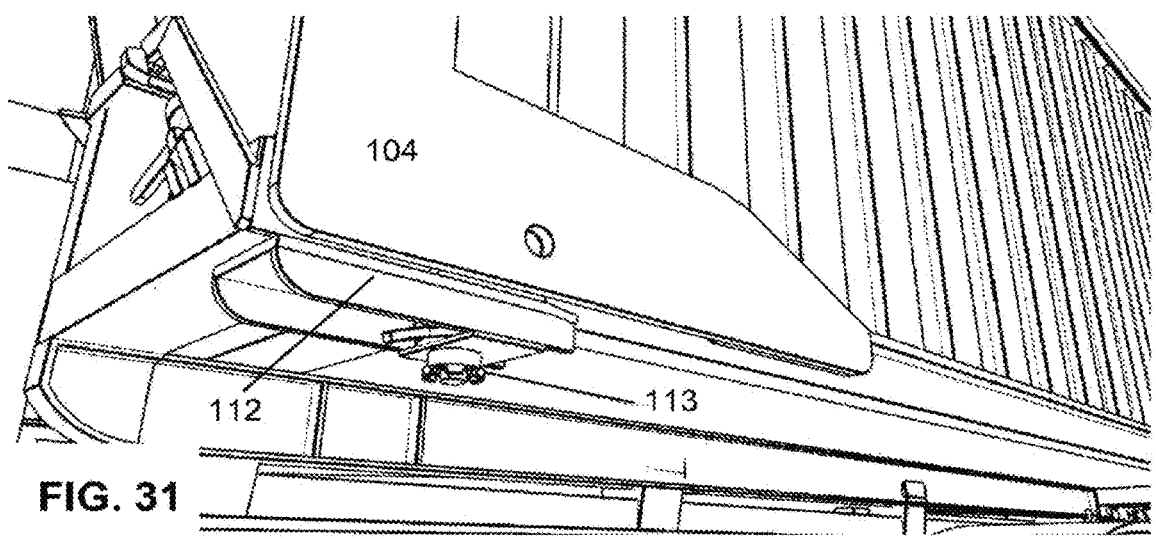
Figure 32:
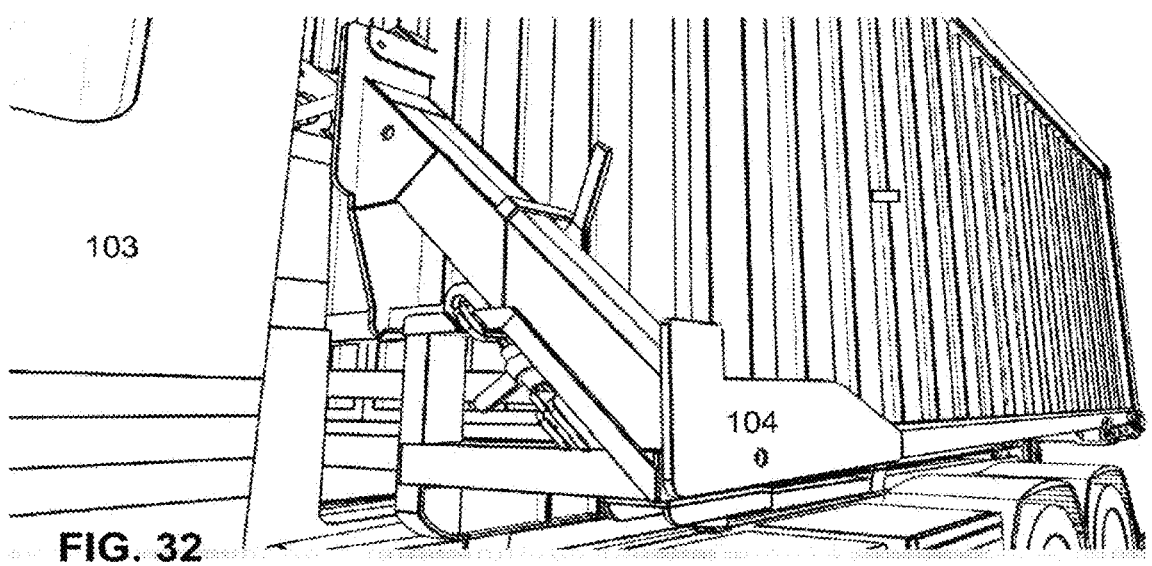
Figure 33:
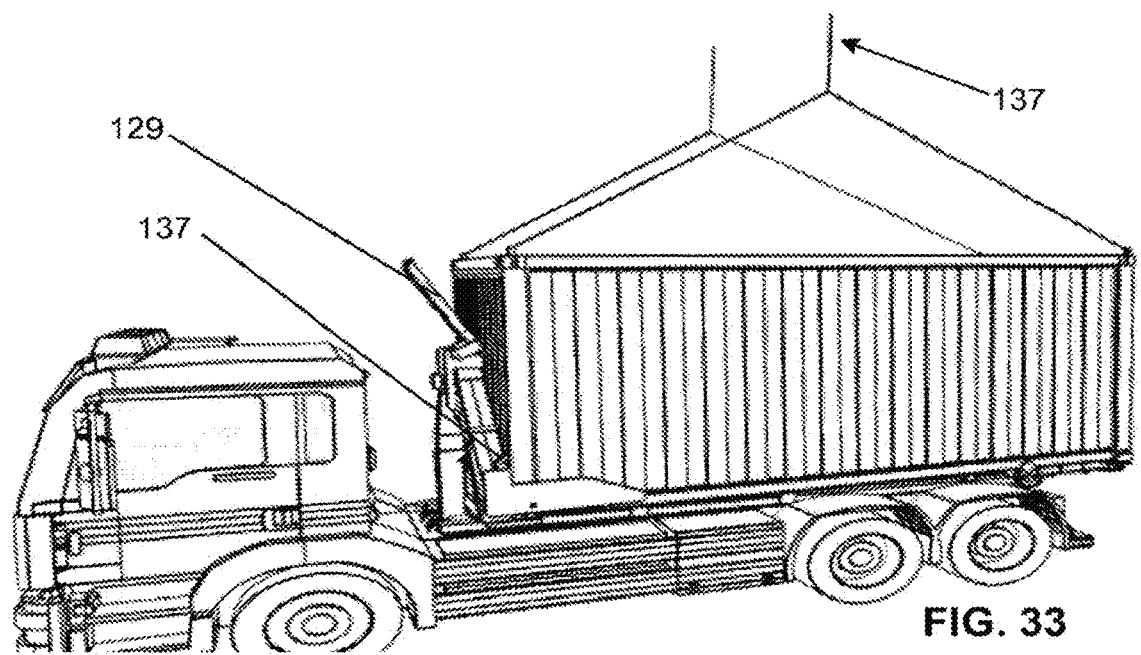
Figure 34:
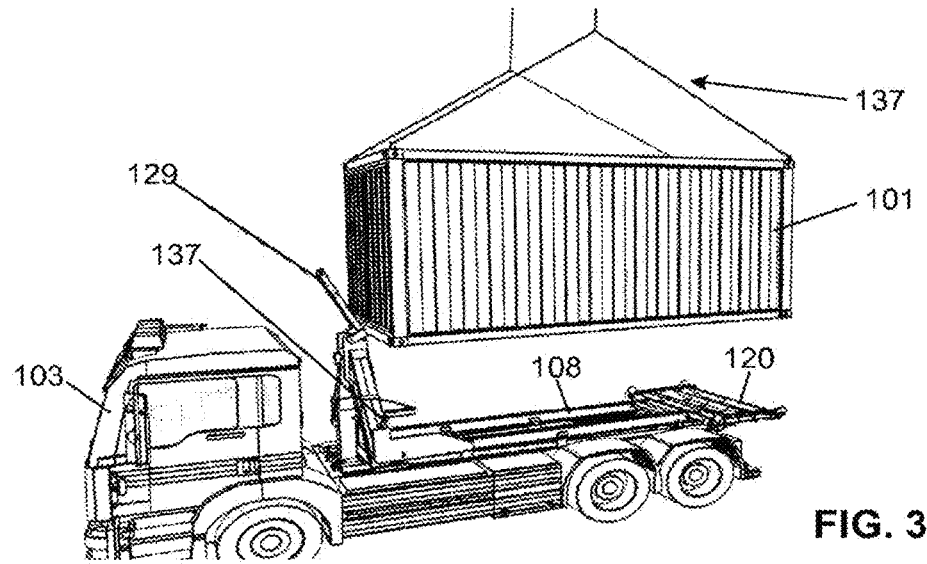
Figure 35:
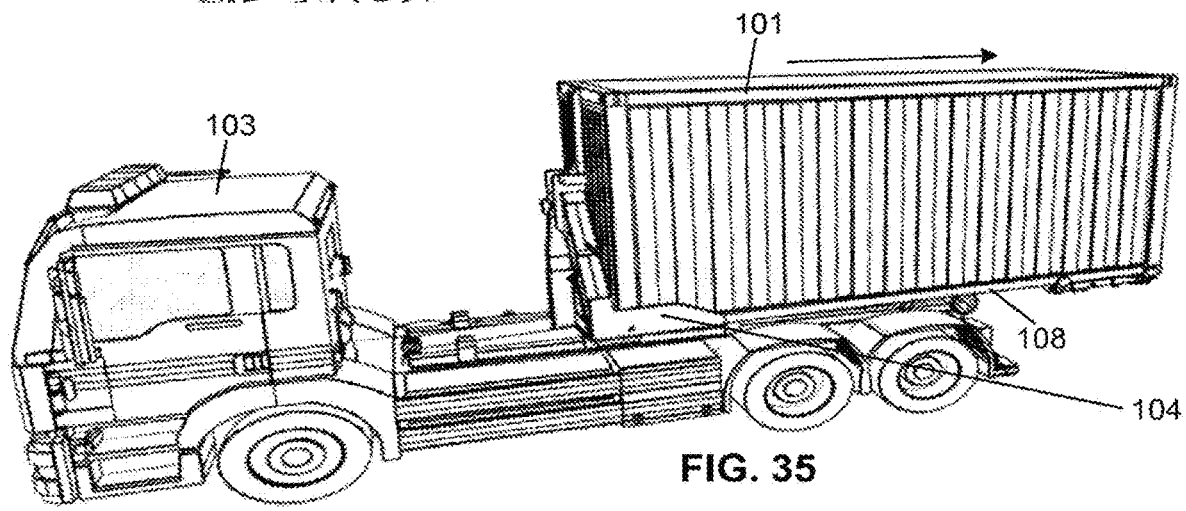
Figure 36:
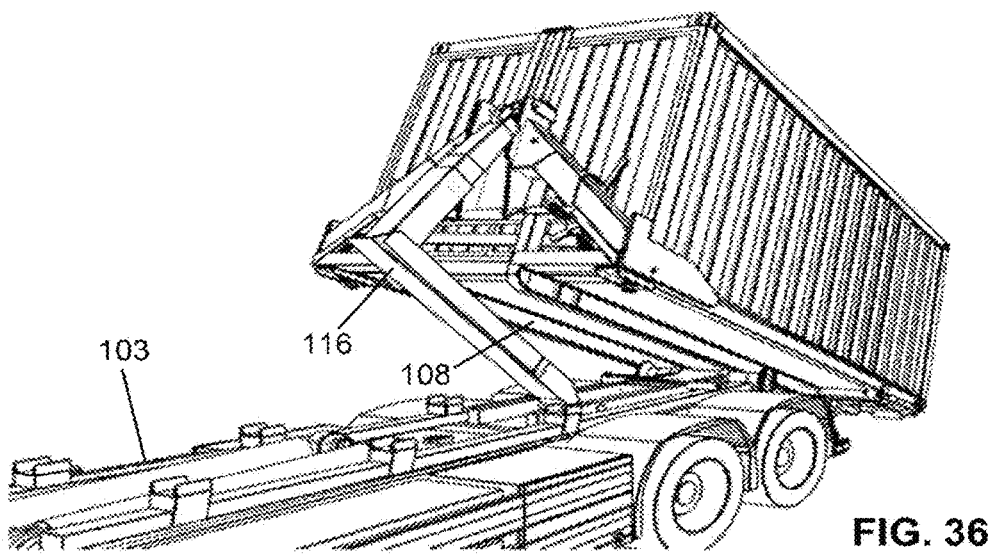
Figure 37:
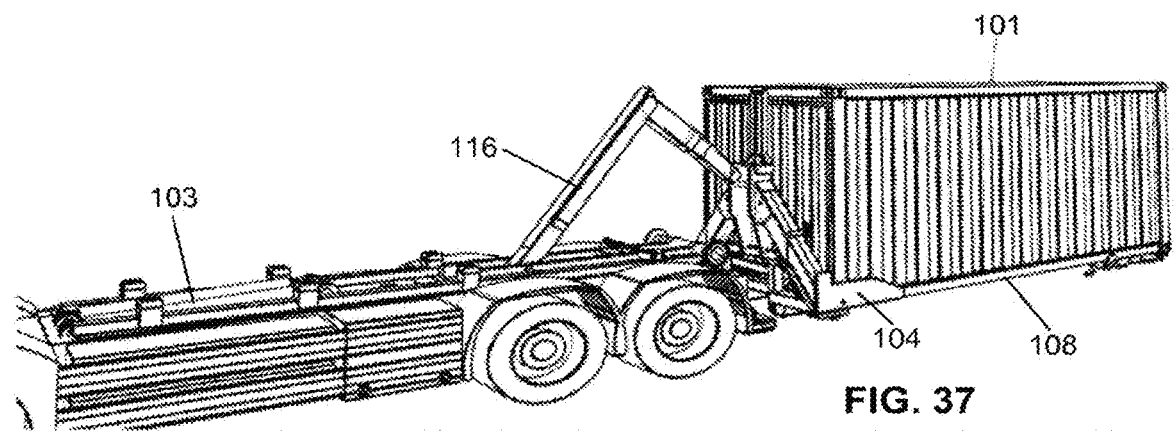

Now, when the transferring device 104 is closed to the closed position and caught the first end 101A of the load unit 101 (FIGS. 18 and 63, for example), the load unit 101 can be transferred by the transferring device 104 by operating the hook system 116 of the vehicle 103, as can be seen in FIGS. 21-32 and 63-66. When the hook system 116 is retracted forwards, the transferring device 104 pulls the load unit 101 so that the load unit 101, advantageously the bottom portion of the load unit 101, meets the tilted ramp 120, as is the case in FIGS. 23 and 64-65. When the load unit 101 is dragged further, it travels along the surface of the ramp 120, and at the same the ramp 120 delivers the load or stress to the rear rollers 122 of the vehicle 103. The guiding protrusions 123 of the ramp 120 guides the load unit 101 and prevents the load unit 101 moving in lateral direction 135, as can be seen in FIGS. 25-27, for example.

When the hook system 116 and thus the transferring device 104 are moved further (e.g. FIGS. 27-29 and 65-66), the transferring device 104 and the first end 101A of the load unit 101 reaches finally the receiving portion 112 of the dock 109, transferring device 104 can then be fastened to the dock via the securing device 110 and also the first end 101A of the load unit 101 can then be fastened by the locking device 113 (e.g. FIG. 29), if used. It is to be noted that technically the fastening or securing of the transferring device 104 to the dock and/or the load unit 101 by the locking device 113 is not mandatory, but of course it increases safety. In addition, the second end 101B of the load unit 101 can be fastened by the locking device 124 of the ramp 120, which can be fastened to the fastening device 125, such as the third hole 125 of the sea container, in the underside portion in the second end 101B of the load unit 101, as is the case in FIG. 30. The unloading the load unit 101 off the vehicle 103 can be done in reversed way than loading.

It is to be noted that the load unit 101 can also be caught by the transferring device 104 also from on another trailer or transferred to another trailer, as can be seen in FIG. 74 and not only from the ground.

It is to be noted also that the vehicle 103 can be moved normally by driving with the load unit 101 on it. In addition, the load unit 101 can be removed off the vehicle 103 for example by a separate crane 137, as is the case in FIGS. 33 and 34. This can be enabled by opening the locking device 113 of the dock 109, locking device 124 of the ramp 120 as well as the catching devices 107 of the transferring device 104 and opening the transferring device 104 to the opening position.

In addition, it is to be noted, that the load unit 101 can be unloaded off the vehicle also with the frame 108, as is illustrated in FIGS. 35-38 and 67. For this, the locking hinge pieces 133, which are arranged around at least partly around the rear roller 122, must be opened, such as unfastened from the ramp 120 and removed around the rear roller 122, whereupon the frame 108 with the load unit 101 can be moved. The unloading can be done by operating with the hook system 116 of the vehicle 103, so moving the hook system 116 and thus the transferring device 104 backwards. In this the transferring device 104 is caught by the hook system 116 via the gripping point 131. It is to be noted that when unloading the frame 108 with the load unit 101, the locking device 113 of the dock 109 and locking device 124 of the ramp 120 are advantageously locked to the corresponding points in the load unit 101, as is discussed elsewhere in this document. In addition, also the catching device 107 of the transferring device 104 is also fastened the fastening device 102 of the load unit 101.

Figure 38:
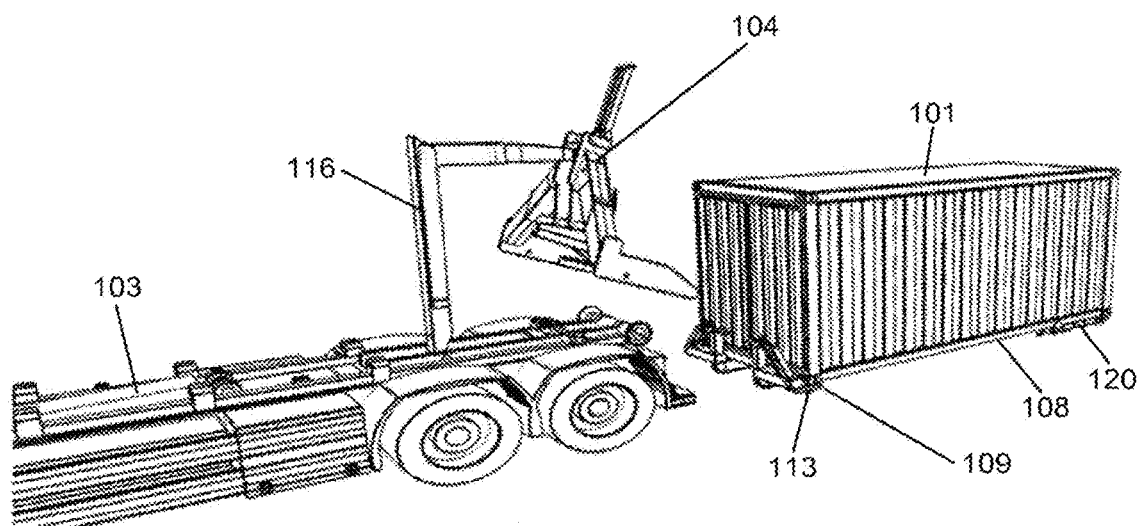

When the frame 108 together with the load unit 101 is unloaded and landed to the ground, the catching device 107 of the transferring device 104 can be opened from the fastening device 102, 132 of the load unit 101, whereupon the transferring device 104 can be lifted away by the hook system 116 of the vehicle 103, as can be seen in FIG. 38. Then the frame 108 can be left to the ground with the load unit 101. The transferring device 104 can be lifted away by the hook system 116 of the vehicle 103, when the catching device 107 of the transferring device 104 is opened. It is to be noted that the frame 108 can be transferred with the load unit also on another trailer or vehicle, as is shown in FIG. 74, whereupon also that trailer or vehicle can be prepared or enabled to carry the load unit, such as a sea container, even if it was not suitable for carrying the load unit, such as a sea container before the frame 108. This is also clear advantage of the present invention.

Figure 39:
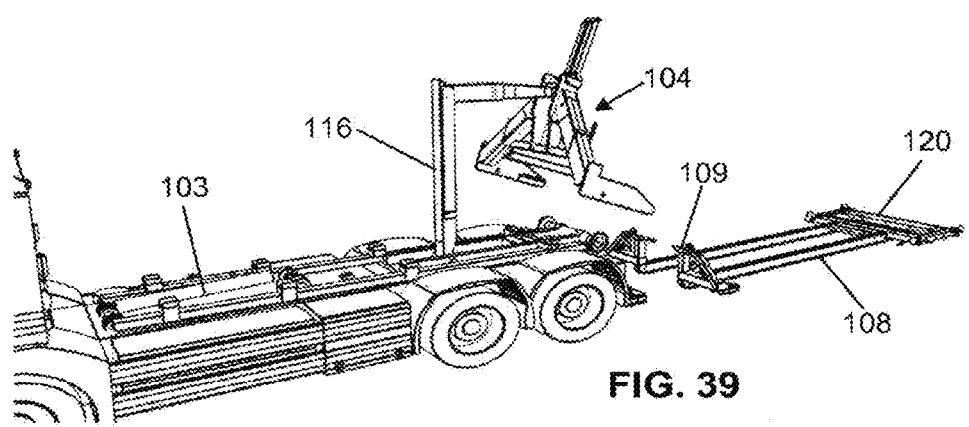
FIGS. 39-49 illustrate a principle of an operation of an exemplary frame for loading and unloading load units on and/or off a vehicle according to an advantageous embodiment of the invention.
Figure 40:
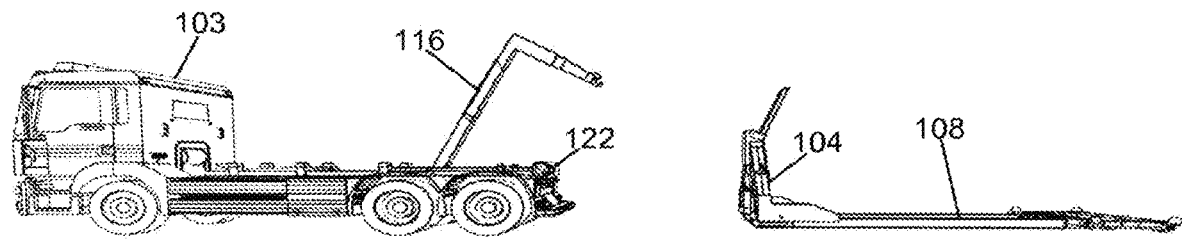
Figure 41:
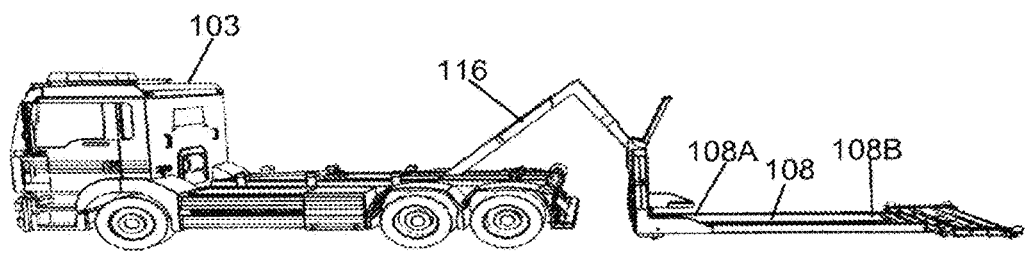
Figure 42:
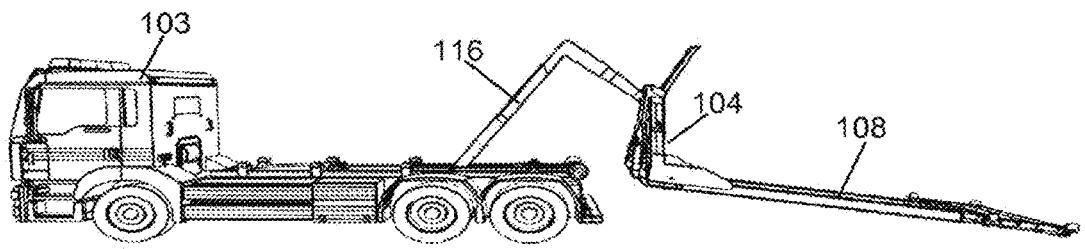
Figure 43:
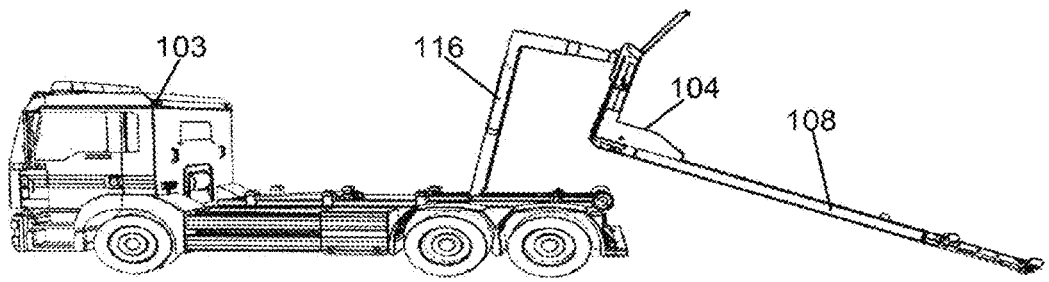
Figure 44:
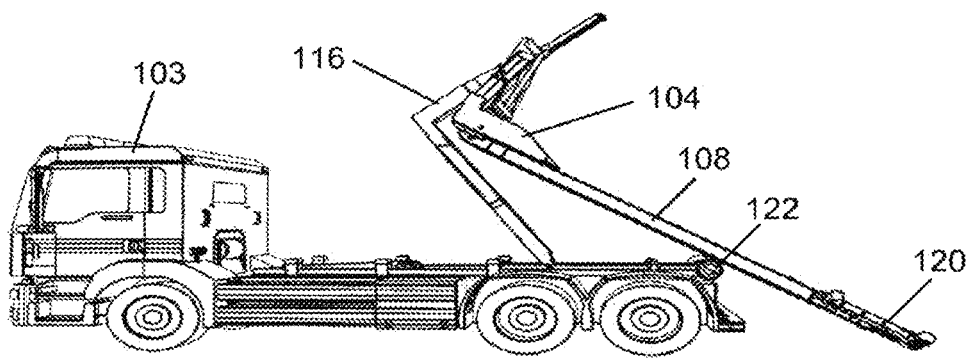
Figure 45:
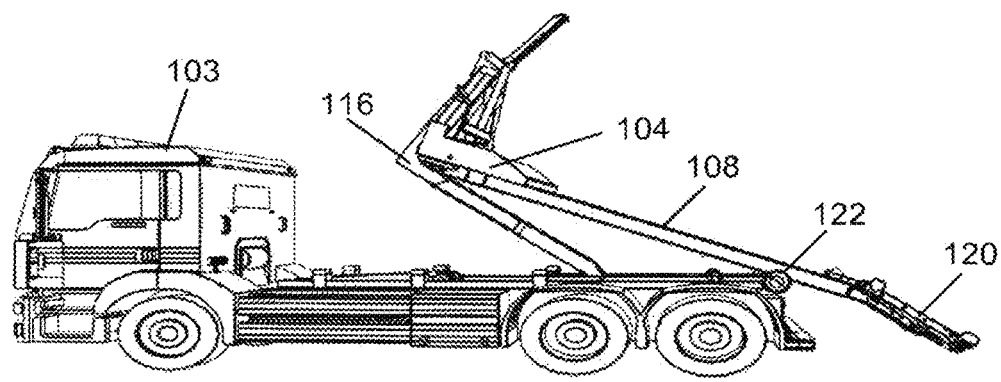
Figure 46:
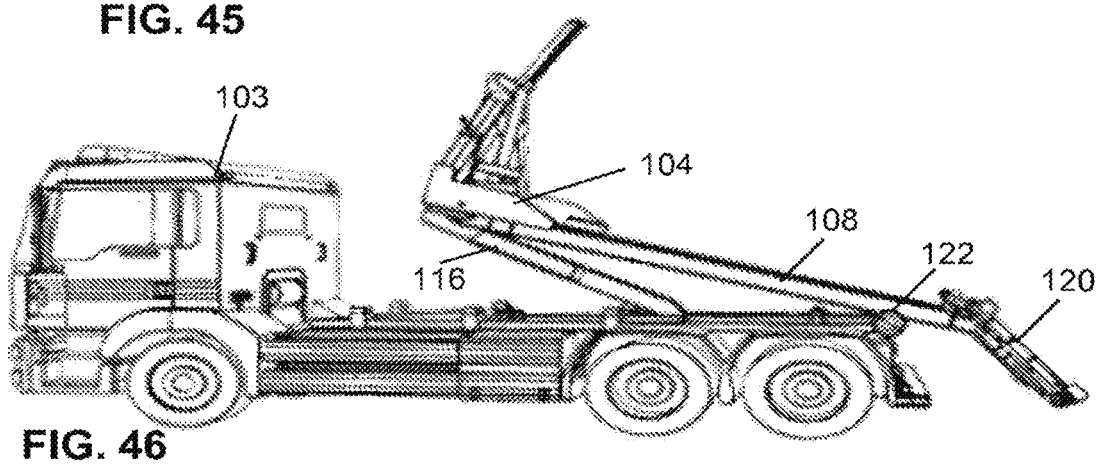
Figure 47:
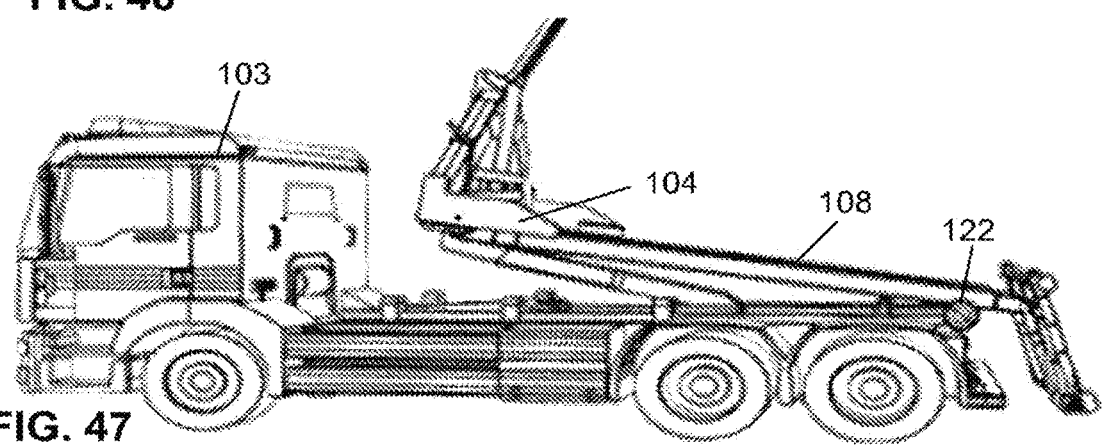
Figure 48:
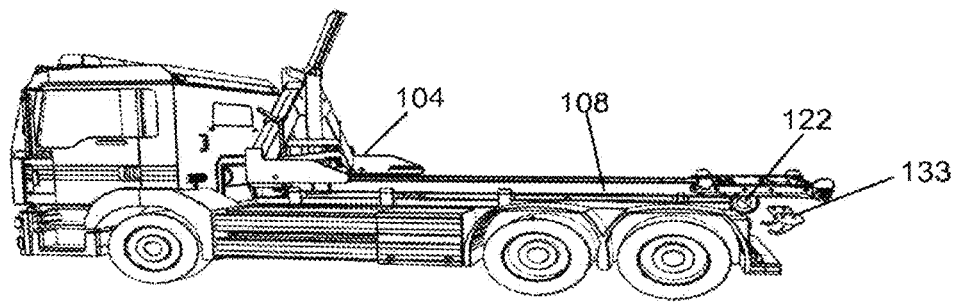
Figure 49:
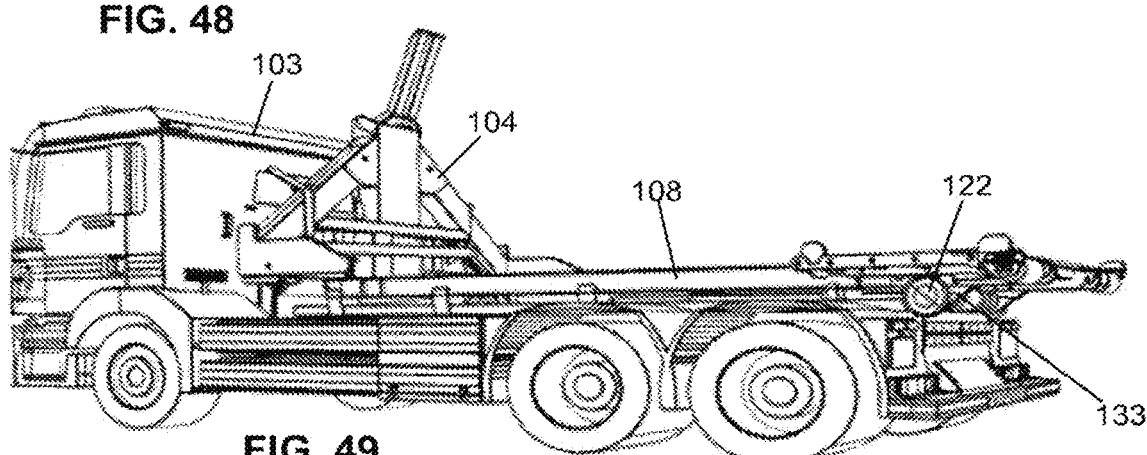
Figure 50:
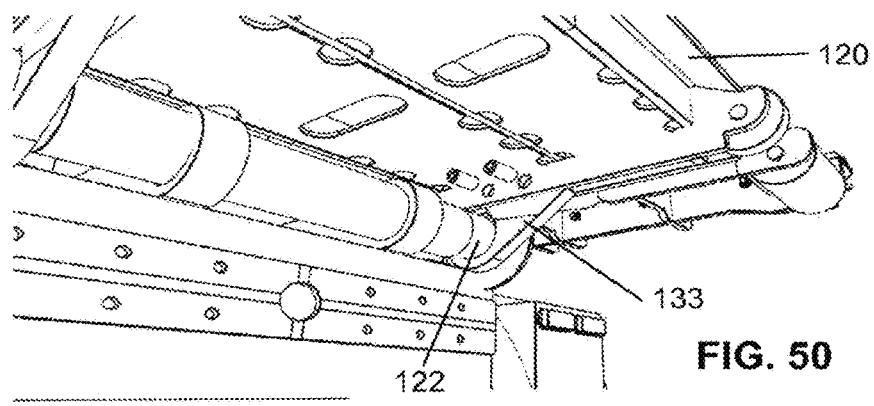
FIGS. 50-57 illustrate example embodiments of the loading arrangement according to an advantageous embodiment of the invention.
Figure 51:
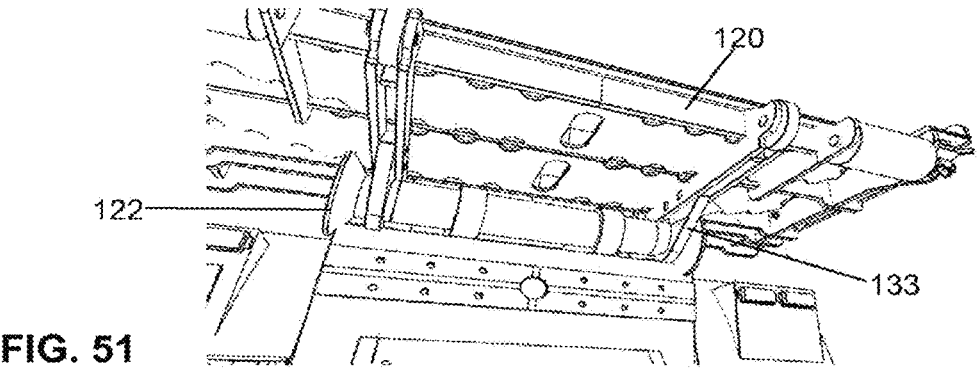
Figure 52:
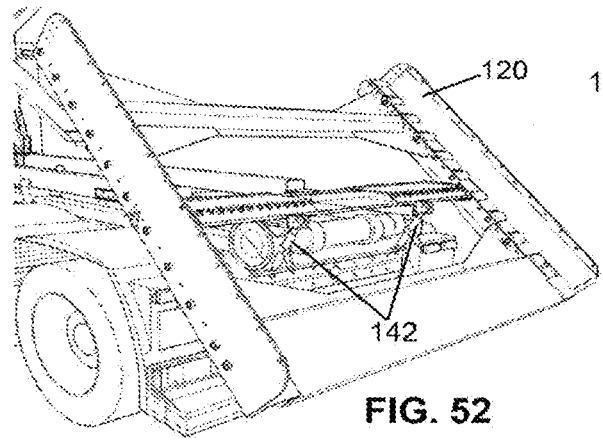
Figure 53:
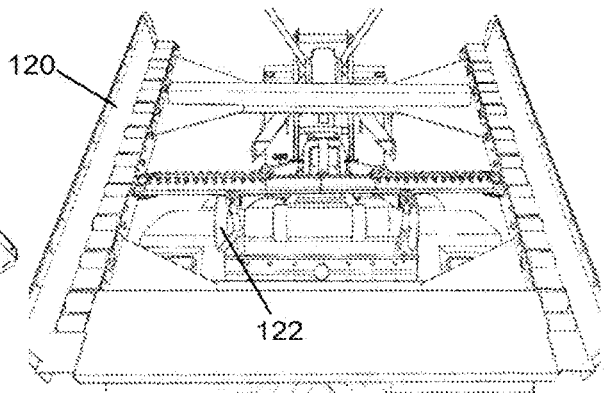
Figure 54:
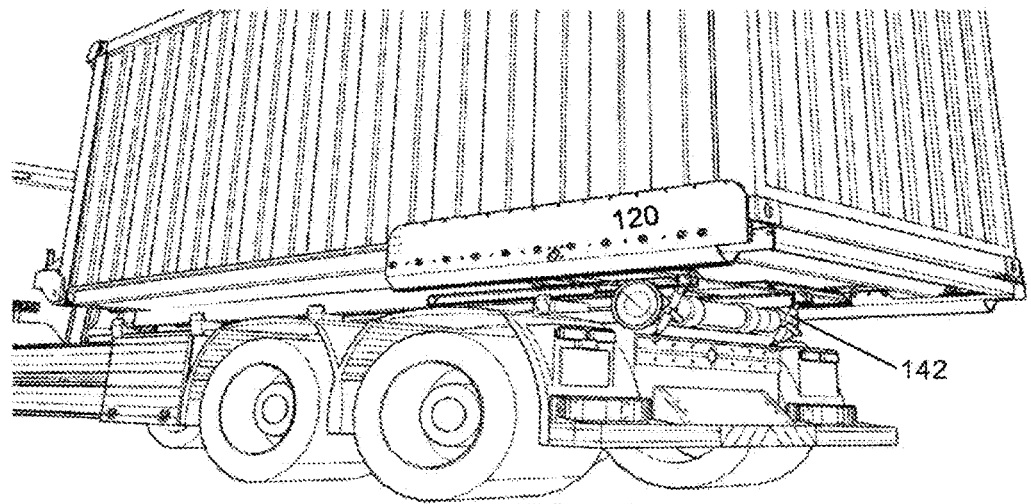
Figure 55:
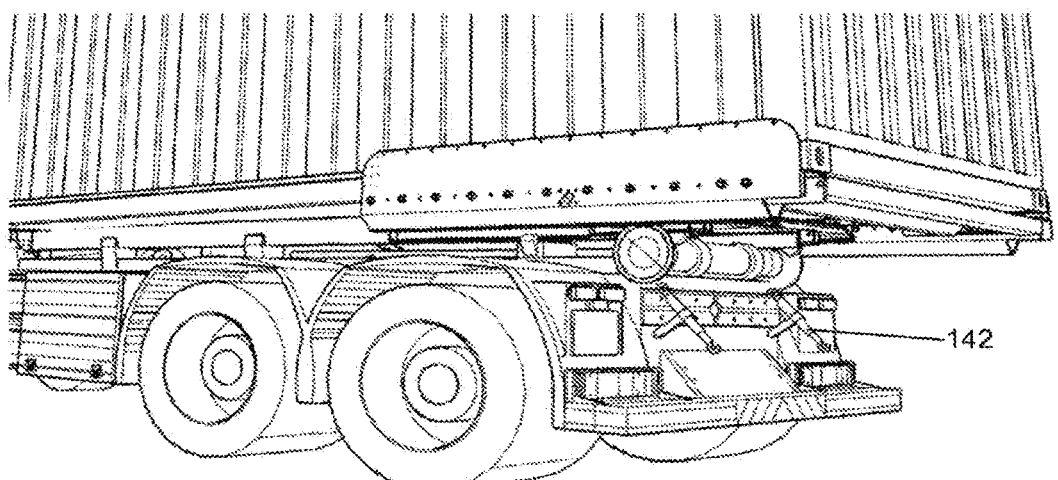

FIGS. 39-57 illustrate an exemplary principle of loading and mounting the frame on the vehicle 103. In FIG. 39 the frame 108 locates on the ground and the transferring device 104 is moved towards the frame 108 by the hooks system 116. The transferring device 104 is advantageously fastened or secured to the dock 109 by the securing device 110 of the dock 109, after which the frame 108 can be loaded on the vehicle 103 by gripping the transferring device 104 secured to the dock 109 and frame 108 by the hook system 116 and dragging the transferring device 104 together with the frame 108 on the vehicle 103, as can be seen in FIGS. 41-49. When the frame 108 is loaded on the vehicle 103, the second end 108B of the frame 108 can then be fastened to the rear portion of the vehicle 103 via the rear rollers 122 of the vehicle 103 by the locking hinge pieces 133 of the ramp 120, as is described elsewhere in this document and as can be seen e.g. FIGS. 50-55. The securing fingers 119 limits the movement of the frame 108 in the lateral direction 135, and optionally the transferring device 104 can be kept fastened to the dock 109 via the securing device 110 of the dock 109, as well as the hook system 116 may be kept gripped to the gripping point 131 of the transferring device 104, whereupon the frame 108 is fastened to the vehicle 103 both via the rear roller 122 as well as via the transferring device 104 and the hooks systems 116 of the vehicle 103. Also, an additional fastening device 142, such as a rim screw, can be used for fastening the ramp and/or the hinge pieces 133. However, it is to be noted that the securing device 110 of the dock 109 can be opened, as well as release the hook system 116 from the gripping point 131, and still the frame 108 (also with the load unit 101) is secured to the vehicle 103 via the rear rollers 122. The frame 108 can be removed off the vehicle 103 only opening and removing also the locking hinge pieces 133 of the ramp 120.

Figure 69:
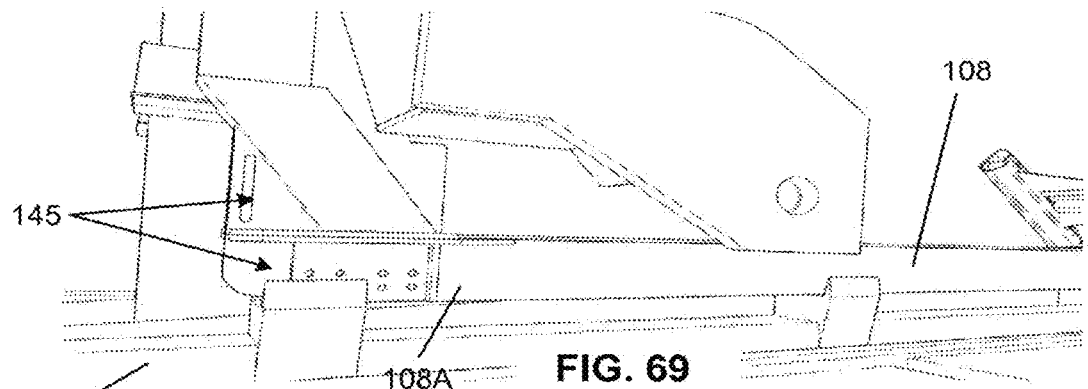
Figure 70:
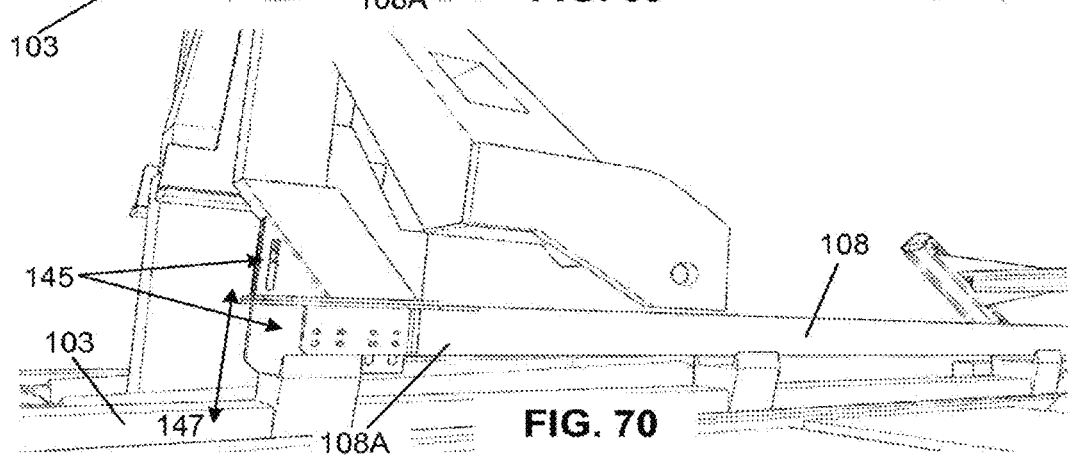

FIGS. 69-70 illustrate an example embodiment for adjusting the loading arrangement according to an advantageous embodiment of the invention for different size hook systems 116. It is to be noted that the size, such as length 146 of the distal boom of the hook system 116 may vary, whereupon the frame 108 comprises an adjusting member 145 for adjusting the position, or height 147, of the first end 108A of the frame 108 (and thus the position of the dock and receiving portion 112 for receiving the transferring device 104) from the body of the vehicle 103 and thus fitting the position of the gripping point 131 of the transferring device 104 in relation to the hook system (especially the distal end of it) 116 when the transferring device 104 is transferred (with or without the load unit) on to the vehicle 103.

The invention has been explained above with reference to the aforementioned embodiments, and several advantages of the invention have been demonstrated. It is clear that the invention is not only restricted to these embodiments but comprises all possible embodiments within the spirit and scope of the inventive thought and the following patent claims.

For example, it is to be noted that in addition to the disclosure and examples, the load units may be also other kinds of load units than container or sea container. In addition, it is to be noted that the transferring device 104 illustrated in FIGS. 1-53, and 55-56 is only example and also other kind of transferring devices can be used, such as an exemplary transferring device 104X illustrated in FIG. 54, where the transferring device 104X still comprises the gripping point 131 to be gripped by the hooks system 116 of the vehicle 103. In addition, the transferring device 104X comprises also the catching device 107 to be fastened to the fastening device 102, 132 of the load unit 101. However, it is to be noted that the catching device 107 may be for example a hook pin, pivot, plug or cable to be introduced to a corresponding fastening device of the load unit. In addition, it is to be noted that the corresponding fastening device of the load unit may be e.g. a hole, groove, hook or even a gripping point like the gripping point 131 of the transferring device 104. In addition, as is described, the dock may comprise said securing device for securing the transferring device in a detachable 10 manner but said securing device can be provided also elsewhere in said first end of the frame, for example.

The features recited in dependent claims are mutually freely combinable unless otherwise explicitly stated.

The invention claimed is:

1. A loading arrangement for loading and unloading load units on and off a vehicle, said load unit having first and second ends,
wherein the arrangement comprises a transferring device for catching and transferring the load unit on and off the vehicle and a frame having first and second ends and to be fastened to the vehicle in a detachable manner, wherein:
the frame comprises a dock, which is arranged in the first end of the frame and wherein the dock comprises a receiving portion for receiving the transferring device for at least loading and unloading said frame on and off the vehicle by the transferring device when said transferring device is operated by a hook system of the vehicle, and
said transferring device comprising a gripping point to be gripped by the hook system of the vehicle and a catching device for catching said load unit and for transferring it on or off the vehicle, when the transferring device is operated by said hook system of the vehicle,
wherein said transferring device comprises:
two elongated arms, at least one arm joined to said transferring device via a hinge, where said hinge is arranged in a proximal end of the at least one arm, whereupon longitudinal axes of said two elongated arms form an angle,
said arms having said catching device arranged in distal ends of the arms, and wherein
said transferring device has open and closed positions, wherein in said open position the angle between the two elongated arms is bigger than in said closed position and wherein in said open position said catching device is configured to be introduced to/from the load unit and wherein in said closed position said catching device is configured to be fastened to the load unit, thereby allowing catching and transferring the load unit.

2. The loading arrangement of claim 1, wherein the frame comprises:
a ramp, which is hinged in the second end of the frame, and wherein the ramp is configured to be turned around the hinge for receiving and guiding the load unit on and off the vehicle, when the load unit is transferred on or off the vehicle, and
wherein said ramp is in addition configured to be hinged around a rear roller of the vehicle and thereby divide load of the load unit to the vehicle structure via the rear roller of the vehicle, when said load unit is transferred, and in addition thereby to fasten said frame to the vehicle via said rear roller in a detachable manner.

3. The loading arrangement of claim 2, wherein the ramp comprises guiding protrusions for guiding said load unit in a lateral direction and a locking device to be introduced to an additional fastening device of the load unit in said second end and to be fastened to said additional fastening device, thereby fastening said second end of said load unit to said frame, when said load unit is loaded on the vehicle.

4. The loading arrangement of claim 1, wherein the frame comprises two elongated frame elements with first and second ends, said frame having a longitudinal axis between said first and second ends and having an opening between the elongated frame elements so that the hook system of the vehicle can be operated between said frame elements in said opening in the direction of said longitudinal axis, for loading or unloading the load unit on or off the vehicle.

5. The loading arrangement of claim 1, wherein said frame is configured to receive and secure said transferring device in a detachable manner, and wherein the transferring device is configured to be released for transferring the load unit on or off the vehicle and to be secured for loading and/or unloading said frame on or off the vehicle when said transferring device is operated by a hook system of the vehicle or to be secured for transporting said transferring device.

6. The loading arrangement of claim 1, wherein the dock comprises a securing device for securing said transferring device in a detachable manner, and wherein said securing device comprises a hook, pin, pivot, plug or cable to be introduced to a corresponding groove in said transferring device.

7. The loading arrangement of claim 1, wherein the catching device comprises a hook, pin, pivot, plug or cable, and wherein the catching device is configured to be fastened to a second fastening device of the load unit so that it allows fastening and unfastening a locking device of the dock to a fastening device of the load unit.

8. The loading arrangement of claim 1, wherein the catching device is arranged to project towards the distal end of another elongated arm, and wherein said catching device is configured to be fastened to fastening device of the load unit, and wherein in said open position said catching device is configured to be introduced to/from the fastening device of the load unit and wherein in said closed position said catching device is configured to be fastened to the fastening device of the load unit.

9. The loading arrangement of claim 1, wherein the transferring device comprises an operable connecting rod arranged between the two elongated arms and attached to the distal portions of the arms, said connecting rod being configured to open said transferring device to the opening position by separating the distal ends of the elongated arms apart from each other and to close said transferring device to the closed position by moving the distal ends of the elongated arms towards each other.

10. The loading arrangement of claim 1, wherein the two elongated arms of the transferring device comprises also supporting projections arranged in said distal ends of the arms and projecting towards the distal end of another elongated arm, said supporting projections being configured to be introduced to corresponding grooves in the bottom portion of the load unit and thereby supporting the load unit from below portion of the load unit, when said transferring device is in said closed position.

11. The loading arrangement of claim 1, wherein the arrangement comprises an elongated boom having first and second ends, where the elongated boom is coupled with the transferring device via a joint arranged in the second end of the elongated boom and wherein the elongated boom comprises also said gripping point to be gripped by the hook system of the vehicle, said gripping point being arranged next to said joint to the second end of the elongated boom and towards the first end of the elongated boom from the gripping point.

12. The loading arrangement of claim 11, wherein the movement of said elongated boom is limited around the joint during loading or unloading the load unit on or off the vehicle by supporting the first end of the elongated boom to the hook system of the vehicle.

13. The loading arrangement of claim 11, wherein the arrangement comprises a mechanical limiting member for limiting the movement of the elongated boom around the joint during loading or unloading the frame on or off the vehicle by the transferring device.

14. The loading arrangement of claim 1, wherein said transferring device comprises in addition to said two elongated hinged arms a fixed gripping member configured to grip the load unit in an opposite side than said two elongated hinged arms.

15. The loading arrangement of claim 1, wherein said transferring device comprises a guiding boom, which is arranged to the upper portion of the transferring device, and wherein a free end of said guiding boom is configured to be introduced to the first end of the load unit, when the transferring device is moved towards the load unit to be caught and transferred, wherein said guiding boom is configured to guide the transferring device so that the longitudinal axis of said two elongated arms and a vertical axes of the transferring device are essentially perpendicular to a longitudinal axis of the load unit to be caught.

16. The loading arrangement of claim 15, wherein said guiding boom comprises a stopping member in the free end of it, whereupon the guiding boom is also configured to guide the transferring device in a vertical direction so that when the stopping member of the free end of the guiding boom meets the upper portion of the load unit, the stopping member configured to stop the movement of the transferring device in said vertical direction and thereby targets the catching devices at the position of a fastening hole of the load unit.

17. The loading arrangement of claim 1, wherein a locking device of the dock is configured to be fastened to the fastening device of the load unit in said first end and fastening said first end of said load unit to said frame in a manner for enabling said transferring device to be opened to said open position or in an unsecured position so to remove said transferring device away from the dock and frame.

18. The loading arrangement of claim 1, wherein the frame is configured to be secured to the vehicle in a lateral direction, perpendicular to said longitudinal axis, via elongated elements so that said elongated elements are configured to be introduced between securing fingers of the vehicle and thereby secure said frame in the lateral direction but allowing said frame to be moved in a vertical direction being perpendicular to said lateral direction and longitudinal axis, and allowing said frame to be moved in the direction of said longitudinal axis, when the ramp is turned around a rear roller and the hinge.

19. A method for loading and unloading load units on and off a vehicle, said load unit having first and second ends, the method comprising:
providing a frame that has first and second ends and a dock in the first end for receiving a transferring device, whereupon the frame is loaded and unloaded on and/or off the vehicle by the transferring device when said transferring device is secured to said dock and operated by a hook system of the vehicle, and wherein said frame is fastened to the vehicle in a detachable manner;
providing the transferring device used for catching and transferring the load unit on or off the vehicle, the transferring device comprising:
a catching device, which is used for catching said load unit and for transferring it on or off the vehicle when the transferring device is operated by said hook system of the vehicle; and two elongated arms, at least one arm joined to said transferring device via a hinge, where said hinge is arranged in a proximal end of the at least one arm, whereupon longitudinal axes of said two elongated arms form an angle, said arms having said catching device arranged in distal ends of the arms; and a gripping point, which is gripped by the hook system of the vehicle, wherein said transferring device has open and closed positions, wherein in said open position the angle between the two elongated arms is bigger than in said closed position and wherein in said open position said catching device is configured to be introduced to/from the load unit and wherein in said closed position said catching device is configured to be fastened to the load unit, thereby allowing catching and transferring the load unit; and catching the load unit and transferring the load unit on and off the vehicle by the transferring device.

\* \* \* \* \*